US006625166B2

(12) United States Patent
Tsukamoto et al.

(10) Patent No.: US 6,625,166 B2
(45) Date of Patent: *Sep. 23, 2003

(54) COMMUNICATION SYSTEM FOR COMMUNICATING A PLURALITY OF TIME-DIVISION MULTIPLEXED DATA, AND CONTROL METHOD THEREFOR

(75) Inventors: Takahiro Tsukamoto, Hoya (JP); Masatomo Ohuchi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,280

(22) Filed: Nov. 12, 1997

(65) Prior Publication Data

US 2002/0071443 A1 Jun. 13, 2002

(30) Foreign Application Priority Data

Nov. 15, 1996 (JP) .............................. 8-318620
Jan. 16, 1997 (JP) .............................. 9-017878

(51) Int. Cl.[7] .............................................. H04L 12/66
(52) U.S. Cl. ....................... 370/466; 370/474; 370/476; 370/535; 714/748
(58) Field of Search .............................. 370/352, 353, 370/354, 356, 401, 462, 463, 466, 468, 477, 537, 535, 419, 420, 442, 458, 473, 474, 476; 714/748, 749

(56) References Cited

U.S. PATENT DOCUMENTS

| | | | |
|---|---|---|---|
| 3,875,339 A | | 4/1975 | Gruen et al. |
| 4,546,212 A | | 10/1985 | Crowder, Sr. |
| 4,569,041 A | | 2/1986 | Takeuchi et al. .............. 370/60 |
| 4,691,314 A | * | 9/1987 | Bergins et al. .............. 370/471 |
| 4,707,826 A | * | 11/1987 | Froggatt ..................... 370/354 |
| 4,757,495 A | | 7/1988 | Decker et al. |
| 4,763,321 A | * | 8/1988 | Calvignac et al. .......... 370/236 |
| 4,809,271 A | | 2/1989 | Kondo et al. |
| 4,876,696 A | | 10/1989 | Yoshikawa ..................... 375/5 |
| 5,063,587 A | | 11/1991 | Semasa et al. |
| 5,130,982 A | * | 7/1992 | Ash et al. .................... 370/449 |

(List continued on next page.)

FOREIGN PATENT DOCUMENTS

JP      A 7-336470      12/1995

OTHER PUBLICATIONS

Stevens, W.R. "TCP Timeout and Retransmission", 1994, Section 21, pp. 297–304.
European Search Report dated Jul. 27, 1999.

*Primary Examiner*—Min Jung
(74) *Attorney, Agent, or Firm*—Morgan & Finnegan, LLP

(57) ABSTRACT

A communication system having first and second communication apparatuses, and communicates a communication frame obtained by time-division multiplexing a plurality of communication data, wherein the communication apparatus: receives first and second communication data; recognizes whether the first or second communication data is received; assembles a time-division multiplexed first communication frame using the communication data to add information indicating a format of the first communication frame to the first communication frame on the basis of a recognition result; and transmits the first communication frame assembled to the second communication apparatus, and the second communication apparatus receives the first communication frame transmitted; checks the format of the first communication frame on the basis of the information added to the first communication frame; and acquires the communication data from the first communication frame, on the basis of a checking result.

21 Claims, 23 Drawing Sheets

U.S. PATENT DOCUMENTS

| | | | |
|---|---|---|---|
| 5,164,938 A | * 11/1992 | Jurkevich et al. | 370/231 |
| 5,164,980 A | 11/1992 | Bush et al. | |
| 5,191,583 A | * 3/1993 | Pearson et al. | 370/242 |
| 5,214,650 A | 5/1993 | Renner et al. | |
| 5,300,980 A | * 4/1994 | Maekawa et al. | 399/8 |
| 5,323,385 A | * 6/1994 | Jurewicz et al. | 370/300 |
| 5,359,644 A | 10/1994 | Tanaka et al. | |
| 5,390,184 A | * 2/1995 | Morris | 370/353 |
| 5,452,289 A | 9/1995 | Sharma et al. | |
| 5,490,152 A | * 2/1996 | Gregg et al. | 714/748 |
| 5,682,386 A | * 10/1997 | Arimilli et al. | 370/468 |
| 5,719,882 A | * 2/1998 | Ellis | 714/749 |
| 5,812,554 A | * 9/1998 | Kadambi et al. | 370/473 |
| 5,954,799 A | * 9/1999 | Goheen et al. | 709/250 |
| 5,991,292 A | * 11/1999 | Focsaneanu et al. | 370/352 |

* cited by examiner

FIG.4

FORMAT OF FIRST FRAME

| SYN | ID | VD1 | ...... | VDn | LD/CD |
|---|---|---|---|---|---|

FIG.5

FRAME FORMAT OF ID IN FIRST FRAME

| KND | LI | NUMBER OF VOICE CHANNELS |
|---|---|---|

FIG.6

FORMAT OF VD(VOICE) FRAME IN FIRST FRAME

| VCB | VDB(Voice Data Block) |
|---|---|

FORMAT OF VCB IN VD(VOICE) FRAME

FORMAT OF LD/CD FRAME IN FIRST FRAME

FORMAT OF LCB IN LD/CD FRAME

EXAMPLE OF USE OF PRI AND STP IN LCB OF LD/CD FRAME

FIG. 10A
PRI:"0"  STP:"0"   LD/CD DATA WITH LOW PRIORITY

FIG. 10B
PRI:"0"  STP:"0"   LD/CD DATA WITH LOW PRIORITY

FIG. 10C
PRI:"1"  STP:"0"   LD/CD DATA WITH HIGH PRIORITY

FIG. 10D
PRI:"1"  STP:"0"   LD/CD DATA WITH HIGH PRIORITY

FIG. 10E
PRI:"1"  STP:"0"   LD/CD DATA WITH HIGH PRIORITY

FIG. 10F
PRI:"1"  STP:"1"   LD/CD DATA WITH HIGH PRIORITY

FIG. 10G
PRI:"0"  STP:"0"   LD/CD DATA WITH LOW PRIORITY

FIG. 10H
PRI:"0"  STP:"0"   LD/CD DATA WITH LOW PRIORITY

FIG. 10 I
PRI:"0"  STP:"1"   LD/CD DATA WITH LOW PRIORITY

FIG.11A

FIRST FRAME FORMAT EXAMPLE 1
(INCLUDING VOICE FRAMES FOR 2 ch)

| SYN | ID | VD1 | VD2 | LD/CD OR EMPTY DATA |
|-----|----|----|-----|---------------------|
|     |    |    |     |                     |

FIG.11B

FIRST FRAME FORMAT EXAMPLE 2
(INCLUDING VOICE FRAME FOR 1 ch)

| SYN | ID | VD1 | LD/CD OR EMPTY DATA |
|-----|----|-----|---------------------|
|     |    |     |                     |

FIG.11C

FIRST FRAME FORMAT EXAMPLE 3
(INCLUDING NO VOICE FRAME)

| SYN | ID | LD/CD OR EMPTY DATA |
|-----|----|---------------------|
|     |    |                     |

FIG.13A

VOICE PACKET EXCHANGED BY DS

| TERMINAL NUMBER | VDB |
|---|---|

FIG.13B

VOICE PACKET EXCHANGED BY DS

| DS ADDRESS | TERMINAL NUMBER | VDB | EOP |
|---|---|---|---|

FIG.14A

LAN/CD PACKET EXCHANGED BY DS

| TERMINAL NUMBER | USER ID | IEEE802.3 FRAME /CONTROL DATA FRAME |
|---|---|---|

FIG.14B

LAN/CD PACKET EXCHANGED BY DS

| DS ADDRESS | TERMINAL NUMBER | USER ID | IEEE802.3 FRAME /CONTROL DATA FRAME | EOP |
|---|---|---|---|---|

TERMINAL NUMBER IN VOICE AND LAN/CD PACKET

VD DATA FRAME OF CELL RELAY NETWORK INTERFACE

FORMAT OF PDU WHICH CONCATENATES VD DATA FRAMES

VOICE ATM CELL

LAN DATA LD/CD FRAME OF CELL RELAY NETWORK INTERFACE

FORMAT OF PDU WHICH CONCATENATES LAN DATA LD/CD FRAMES

LAN ATM CELL

FIG.23
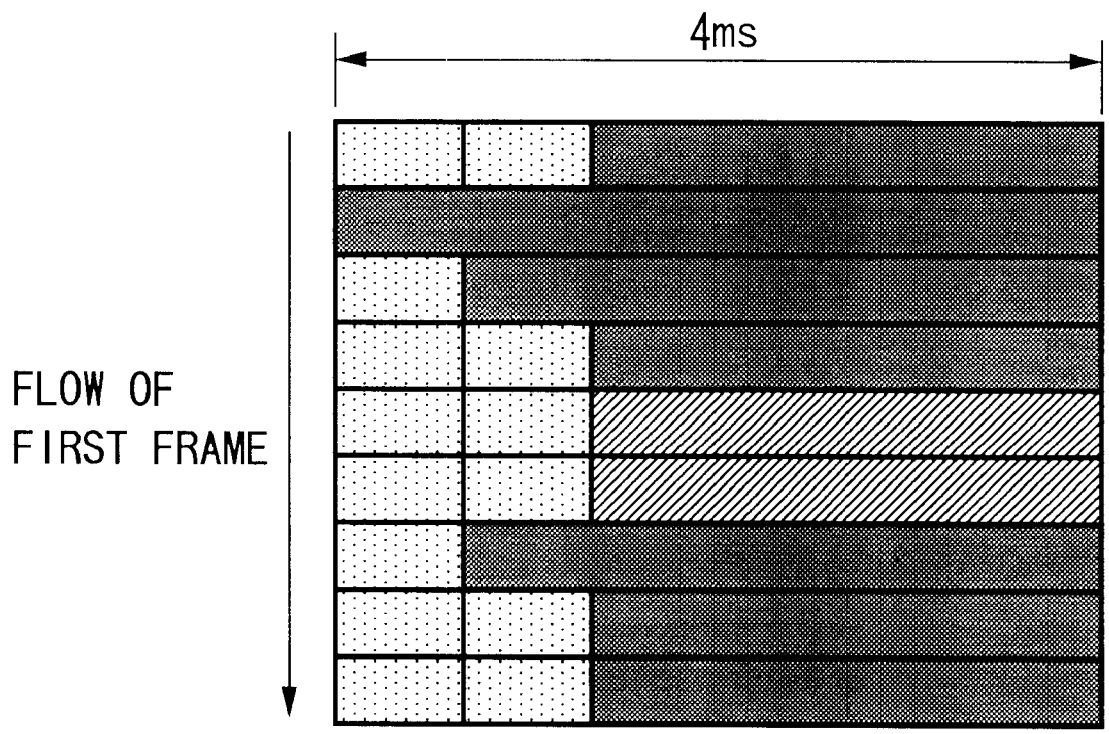
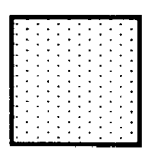 VOICE DATA
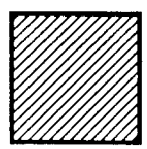 CD DATA
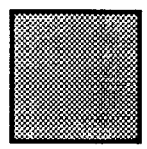 LD DATA

FIG.25

CHANNEL TRANSFER RATE : 64kbps

| NUMBER OF VOICE FRAMES | ALPHA FACTOR | BETA FACTOR |
|---|---|---|
| 0 | $\alpha 00$ | $\beta 00$ |
| 1 | $\alpha 01$ | $\beta 01$ |
| 2 | $\alpha 02$ | $\beta 02$ |

CHANNEL TRANSFER RATE : 128kbps

| NUMBER OF VOICE FRAMES | ALPHA FACTOR | BETA FACTOR |
|---|---|---|
| 0 | $\alpha 10$ | $\beta 10$ |
| 1 | $\alpha 11$ | $\beta 11$ |
| 2 | $\alpha 12$ | $\beta 12$ |
| 3 | $\alpha 13$ | $\beta 13$ |
| 4 | $\alpha 14$ | $\beta 14$ |

FIG.26

(1) PERMANENT ASSIGNMENT

| TELEPHONE 1 | TELEPHONE 2 | DATA COMMUNICATION |
|---|---|---|
| (9) | (9) | (14) |

(2) DYNAMIC ASSIGNMENT
(CONSTANT TIME SLOT ASSIGNMENT)

| TELEPHONE 1 | DATA COMMUNICATION |
|---|---|
| (9) | (14) |

(3) DYNAMIC ASSIGNMENT
(VARIABLE TIME SLOT ASSIGNMENT)

| TELEPHONE 1 | DATA COMMUNICATION |
|---|---|
| (9) | (23) |

FIG.28

| TCP A | | TCP B |
|---|---|---|
| 1. CLOSED | | LISTEN |
| 2. SYN-SENT | →<SEQ=100><CTL=SYN> | → SYN-RECEIVED |
| 3. ESTABLISHED | ←<SEQ=300><ACK=101><CTL=SYN. ACK> | ← SYN-RECEIVED |
| 4. ESTABLISHED | →<SEQ=101><ACK=301><CTL=ACK> | → ESTABLISHED |
| 5. ESTABLISHED | →<SEQ=101><ACK=301><CTL=ACK><DATA> | → ESTABLISHED |

Basic 3-Way Handshake for Connection Synchronization

TCP Header Format

Note that one tick mark represents one bit position.

FIG.33

CHANNEL TRANSFER RATE : 64kbps

| NUMBER OF TELEPHONE CHANNELS | ALPHA FACTOR | BETA FACTOR |
|---|---|---|
| 0 | α00 | β00 |
| 1 | α01 | β01 |
| 2 | α02 | β02 |

CHANNEL TRANSFER RATE : 128kbps

| NUMBER OF TELEPHONE CHANNELS | ALPHA FACTOR | BETA FACTOR |
|---|---|---|
| 0 | α10 | β10 |
| 1 | α11 | β11 |
| 2 | α12 | β12 |
| 3 | α13 | β13 |
| 4 | α14 | β14 |

# COMMUNICATION SYSTEM FOR COMMUNICATING A PLURALITY OF TIME-DIVISION MULTIPLEXED DATA, AND CONTROL METHOD THEREFOR

BACKGROUND OF THE INVENTION

1. Field of the Invention

The present invention relates to a communication system for communicating a plurality of time-division multiplexed data, and a control method therefor.

2. Description of the Relates Art

In general, a multimedia communication system uses a method of transmitting real-time data in a PBX (private branch exchange) that combines voice data and the like, and non-real-time data that permit a delay to some extent in a LAN (local area network by, e.g., time-division multiplexing. Recently, a system that transmits data by dynamically assigning time slots using a statistical multiplexing effect has come into existence.

The time-division multiplexing method will be explained below.

FIG. 26 shows the arrangement upon multiplexing telephone data and data communication data using a 4-msec frame as a fundamental frame on a 64-kbps transmission path. The multiplexing includes a method of permanently assigning time slots to the individual media, and a method of dynamically and variably assigning time slots.

These two methods will be explained below with reference to FIG. 26. Assume that two telephone data and one data communication data are to be multiplexed. In this case, the 4-msec frame in the 64-kbps path corresponds to a 32-byte length. Numerical values in parentheses in FIG. 26 respectively indicate time slots assigned to the individual communications.

In the permanent assignment method, the individual media data occupy the entire multiplexed datastream. More specifically, for example, if there is no second telephone channel data (not busy), empty data is set in that period to make communications ((1) of FIG. 26).

In contrast to this, in the dynamic time slot assignment method, if there is no second telephone channel data, a message indicating that transmission of a communication frame having no second channel data is supplied in advance to the other end-system or other host, and thereafter, that time slot is assigned to the data communication, thus saving the total length of the multiplexed datastream ((2) of FIG. 26).

In another method, the entire multiplexed line length remains the same, and the time slot of the data communication is increased accordingly ((3) of FIG. 26).

In this case as well, when the contents of the format of the communication frame change, a message indicating the change in contents of the format of the communication frame is supplied in advance to the other end-system, and thereafter, the changed communication frame is transmitted.

However, in the permanent time slot assignment method in TDM used in the conventional multimedia communication system, since each transmission time slot to be used is assured even in an inactive state, the transmission time slot cannot be used by other media even when the time slot is not in use in practice. Also, since data transfer is done by one-to-one communications, data transfer cannot be done by simultaneously connecting multipoints.

In the system that transmits data by dynamically assigning time slots using the statistical multiplexing effect, since the data multiplexing method is the unique one, data transfer is done by one-to-one communications, but cannot be done by simultaneously connecting multipoints, as in the former TDM method. In addition, this system cannot be connected to a public network.

Furthermore, since private networks such as LANs are to be connected using services such as a dedicated channel network, frame relay network, and the like, voice communications cannot be simultaneously made.

In the method of dynamically assigning time slots, when the communication frame format is dynamically changed, a message that indicates the change in format of the communication frame must be supplied to the other end-system before transmission of the communication frame whose format has changed.

After this message is supplied, the communication frame whose format has changed is transmitted.

Communications that include IP packet communications using an Internet protocol as data communications, which are transfer-controlled by a TCP (Transmission Control Protocol) will be examined below. The TCP operation will be explained below.

In the TCP, handshake is attained by the sequence number, acknowledgement number, and control bits, and the transmission interval and volume of transfer data are controlled by the window size and retransmission timeout time.

FIG. 29 shows the format of a TCP header.

In FIG. 29, "Source Port" indicates a port number of a source, and "Destination Port" indicates the port number of a destination. "Sequence Number" is a number that indicates the head of data to be transmitted, and "Acknowledgement Number" is the number of data next to the received data. "Data Offset" indicates the head of the data area in the header.

As the control bits, "URG" is a bit indicating the validity of an urgent pointer, and "ACK" is a bit indicating the validity of the acknowledgement number. "PSH" is a bit for instructing transfer of data to the application layer, and "RST" is a bit for forcibly terminating connection. "SYN" is a control bit for sequence number synchronization, and "FIN" is a bit for terminating connection.

"Window" indicates the data volume that can be transmitted without any acknowledgement. "Checksum" is the checksum of the header and data, and "Urgent Pointer" is a pointer indicating the end of data requiring real-time processing.

"Options" indicates the maximum segment length, and "Padding" is data (padding) to be set so that data can start from a 32-bit boundary. "data" is the data to be actually transferred.

A typical procedure for establishing a connection will be described below with reference to FIGS. 27 and 28.

For example, when communication terminals A 2701 and B 2702 make communications based on an FTP (File Transfer Protocol), these communication terminals execute the following processing.

(a) An FTP process of communication terminal A 2701 issues a connection establishment request to communication terminal B2702 to a TCP module.

(b) The TCP module of communication terminal A 2701 handshakes with a TCP module of communication terminal B 2702 to request connection establishment.

(c) The TCP module of communication terminal B 2702 sends back a response to the connection establishment request.

(d) Process A 2707 sets data to be transferred by the TCP in a buffer 2703.

(e) Subsequently, process A 2707 issues a data transmission request to TCP module A 2705.

(f) TCP module A 2705 fetches the data in the buffer in units of TCP transmission segments.

(g) Furthermore, TCP module A 2705 adds a header set with control bits and the like to the data, and sends it to the TCP module of communication terminal B 2702.

(h) The TCP module of the communication terminal B 2702 sends back a response indicating data reception.

(i) At the same time, TCP module B 2706 stores the response in a communication buffer 2704.

(j) TCP module B 2706 informs process B 2708 of data reception.

(k) Process B 2708 receives that data as FTP data. The operations of the two TCP modules from (b) to (g) will be described in more detail below.

(1) The TCP module of the transmitter is in the inactive state (CLOSED), and the TCP module of the receiver is in a receivable state (LISTEN) of communication data from another terminal.

(2) TCP module A that received the connection establishment request from process A sends a TCP segment set with an appropriate sequence number (100) and SYN of the control bits to TCP module B (b).

(3) TCP module B sends back a response to that segment using appropriate SEQ (sequence number)=300. At this time, ACK (acknowledgement number) is incremented by one from the received number, and SYN and ACK are set as the control bits (c).

(4) TCP module A sends back a response to that ACK with SEQ=101 and ACK=301, which is incremented by one from the received number.

In this manner, synchronization (SYN) of SEQ is established between TCP modules A and B. Thereafter, TCP modules A and B make communications respectively with SEQ=101 and 301.

The window size and retransmission timeout time will be explained below with reference to FIG. 30. In the TCP control method, the transmitter basically transmits the next data after it receives ACK. However, the receiver can show the data volume that can be transmitted without any ACK, using a "Window" portion in the header format.

The upper portion of FIG. 30 shows this state. Assume that communication terminal B as the receiver has been notified of the window size=30 (bytes) in previous communications. Communication terminal A as the transmitter sends a segment including 4-byte data contents (a TCP communication unit) with SEQ=101. Subsequently, terminal A can send a segment including 8-byte data contents with SEQ=105 and a segment including 7-byte data contents with SEQ=113 before receiving ACK from the receiver (the transmitter can send data up to 30 bytes while expecting ACK from the receiver).

The transmitter starts a timer in correspondence with the SEQ number upon sending each segment. The transmitter stops that timer when it receives ACK (the actual numerical value is SEQ number+data length) corresponding to that SEQ number. If the timer has elapsed (has reached timeout) before receiving ACK, the transmitter resends the corresponding segment.

As can be understood from the above-mentioned operation principle, when a short retransmission timeout time is set (when the performance of the transmission path/receiver is overestimated), the number of times of retransmission increases, resulting in a large traffic. On the other hand, when a long retransmission timeout time is set (when the performance of the transmission path/receiver is underestimated), retransmission of data is delayed when retransmission is required in fact.

As a method of determining the timeout time, RFC793 (Internet Engineering Task Force) describes the following example.

An Example Retransmission Timeout Procedure

Measure the elapsed time between sending a data octet with a particular sequence number and receiving an acknowledgement that covers that sequence number (segments sent do not have to match segments received). This measured elapsed time is the Round Trip Time (RTT). Next compute a Smoothed Round Trip Time (SRTT) as:

$$SRTT=(ALPHA*SRTT)+((1-ALPHA)*RTT)$$

and based on this, compute the retransmission timeout (RTO) as:

$$RTO=\min[UBOUND, \max[L\ BOUND, (BETA*SRTT)]]$$

where UBOUND is an upper bound on the timeout (e.g., 1 minute). LBOUND is a lower bound on the timeout (e.g., 1 second). ALPHA is a smoothing factor (e.g., 0.8 to 0.9), and BETA is a delay variance factor (e.g., 1.3 to 2.0).

Note that RTT (Round Trip Time) is the actually measured value from transmission until ACK reception. As can be seen from the above computation contents, the timeout time value is determined by SRTT based on actual RTT and factor BETA. That is, the TCP module cannot determine whether "RTT has changed contingently"/"RTT is going to stay stable for a while".

This is a general determination method. That is, even when one or more incoming lines go inactive, and the entire length for IP packet communications has clearly improved like communications on the channel based on the multiplexing method that can vary time slots to the individual media, the timeout time is set based on RTT alone regardless of such improvement. For this reason, much time is required until a suitable timeout time is set, or a relatively long timeout time is set.

SUMMARY OF THE INVENTION

It is an object of the present invention to provide a multimedia communication system and multimedia communication method, which can attain multipoint connections at the same time, and can transmit real-time data while maintaining its real-time characteristics simultaneously with transmission of non-real-time data.

It is another object of the present invention to set the timeout time used for determining retransmission at an appropriate value on the basis of the time slot assignment in a multiplexing communication method that dynamically assigns time slots.

It is still another object of the present invention to transmit a communication frame whose format has changed without informing the other end-system of the change in format of the communication frame in a multiplexing communication method that dynamically assigns time slots.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows the format of a first frame transferred between the adapter and node in the multimedia communication system shown in FIG. 1;

FIG. 5 shows the format of an ID frame in the first frame shown in FIG. 4;

FIG. 6 shows the format of a voice frame in the first frame shown in FIG. 4;

FIGS. 10A to 10I show an example of use of "PRI" and "STP" bits in LCB shown in FIG. 9;

FIGS. 11A to 11C show examples of the data formats of the first frame in the multimedia communication system shown in FIG. 1;

FIGS. 13A and 13B show the formats of voice packets (second frames) exchanged by a data switch in the node shown in FIG. 3;

FIGS. 14A and 14B show the formats of LAN/CD packets (second frames) exchanged by the data switch in the node shown in FIG. 3;

FIG. 23 is a chart showing an example of transmission of the first frame in the first embodiment;

FIG. 25 shows tables for determining the retransmission timeout time in the first embodiment;

FIG. 26 is an explanatory view showing examples of time slot assignment in a conventional TDM system;

FIG. 28 is an explanatory view showing the handshake sequence in a conventional TCP connection;

FIG. 33 is an explanatory view showing a table for determining the retransmission timeout time in the second embodiment.

DESCRIPTION OF THE PREFERRED EMBODIMENTS

The preferred embodiments of the present invention will be described hereinafter with reference to the accompanying drawings.

First Embodiment

Figure 1:
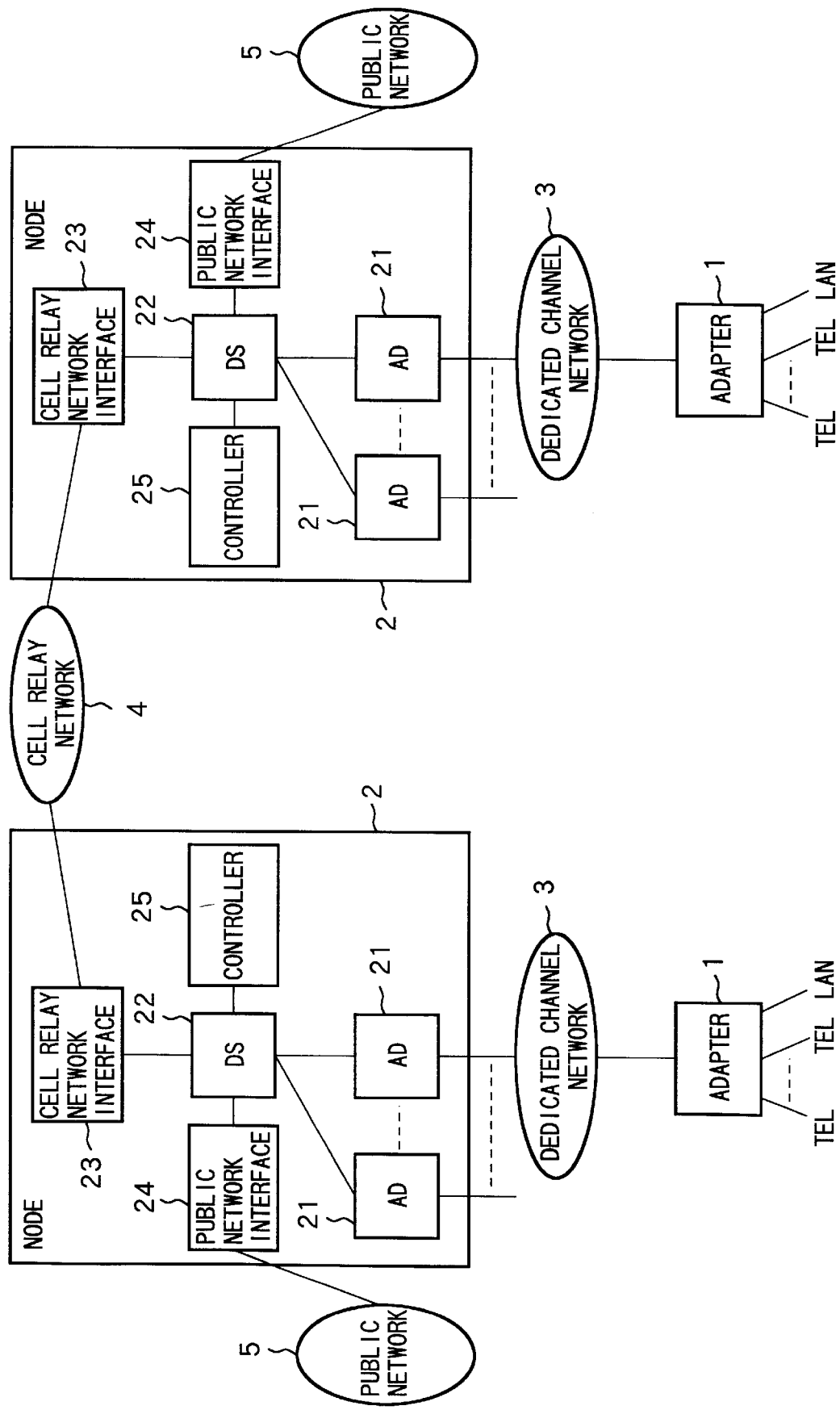
FIG. 1 is a block diagram showing the arrangement of a multimedia communication system according to the first embodiment of the present invention.
Figure 2:
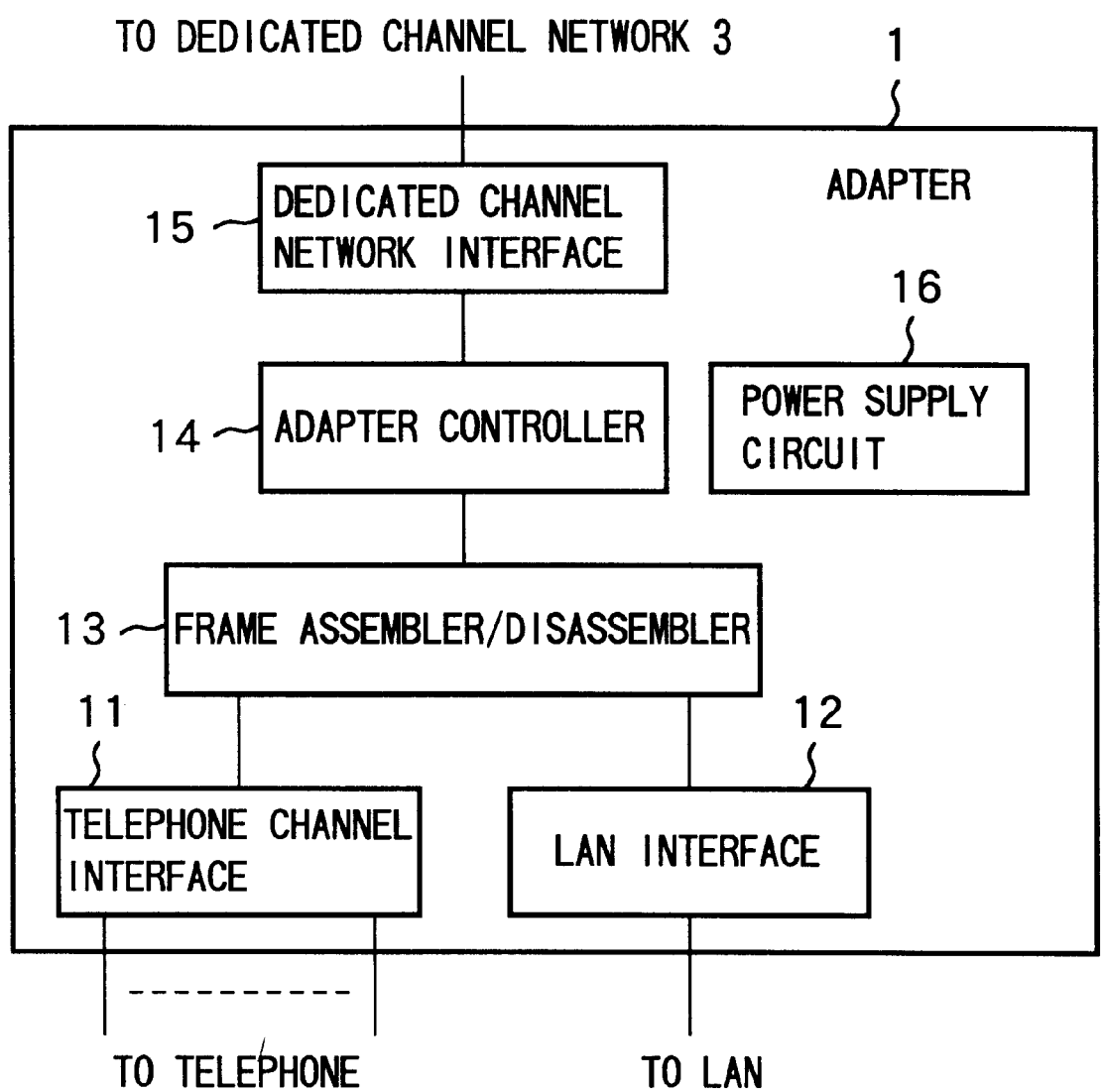
FIG. 2 is a block diagram showing the arrangement of an adapter in the multimedia communication system of the first embodiment.
Figure 3:
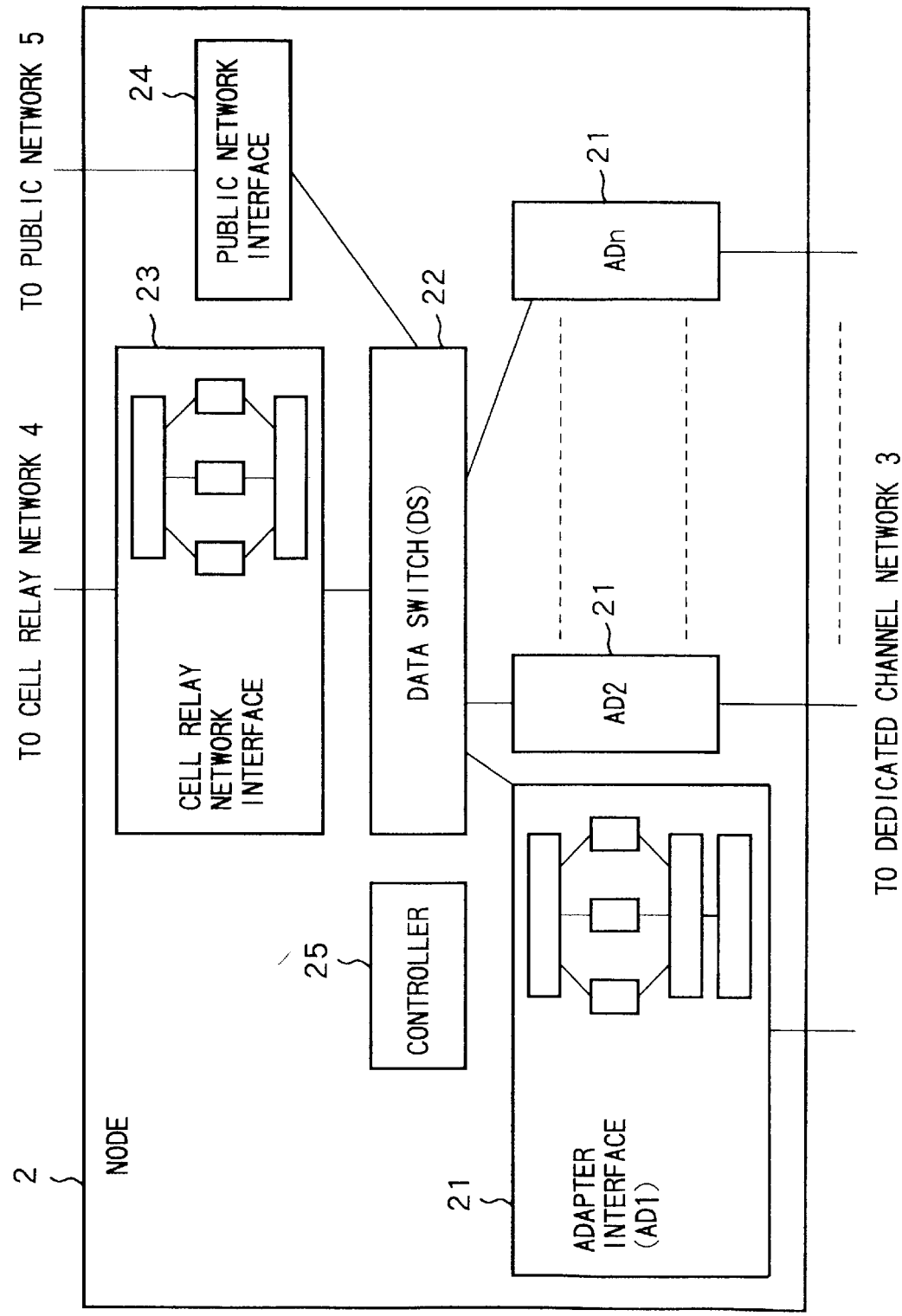
FIG. 3 is a block diagram showing the arrangement of a node in the multimedia communication system shown in FIG. 1.

FIG. 1 is a block diagram showing the arrangement of a multimedia communication system according to the first embodiment of the present invention, FIG. 2 is a block diagram showing the arrangement of an adapter 1 in the multimedia communication system shown in FIG. 1, and FIG. 3 is a block diagram showing the arrangement of a node 2 in the multimedia communication system shown in FIG. 1.

The multimedia communication system to be described in this embodiment can transmit both voice data from a telephone, which data requires real-time processing, and non-real-time LAN data which permits a delay to some extent. As shown in FIG. 1, this multimedia communication system comprises a plurality of adapters 1, each of which connects a plurality of telephones and also connects a LAN terminal for, e.g., Ethernet, and a plurality of nodes 2, each of which connects a public network 5 used as a general telephone network, and exchanges various data including voice data and LAN data in correspondence with their destinations. Each adapter 1 is connected to the corresponding node 2 via a dedicated channel network 3, and the nodes 2 are connected to each other via a cell relay network 4. The cell relay network 4 transfers ATM (asynchronous transfer mode) cells using dedicated channel secondary group velocity frames defined by TTC standards JT-G703-a.

Each adapter 1 has a function of converting voice data from the connected telephones and LAN data from the LAN terminal into a first frame by multiplexing them in time slots that are dynamically assigned using a statistical multiplexing effect, and a function of disassembling the first frame into voice and LAN data. The first frame is made up of a fixed-length data frame generated at predetermined periods, and the data frame includes fixed-length voice data from a plurality of channels, and variable-length LAN data. The LAN data is made up of one of LAN data and control data. Note that the first frame will be described in detail later.

More specifically, each adapter 1 has a telephone channel interface 11 having a plurality of ports connected to the telephones, and a LAN interface 12 connected to the LAN terminal, as shown in FIG. 2.

The telephone channel interface 11 has various interface control circuits for the individual telephone channels such as a booster for generating a voltage required for generating a ringing signal of the telephone, a ringer (ringing signal)

generator, a DTMF decoder, a hook detector, and the like. These circuits include a CODEC (coding/decoding) circuit for inputting/outputting voice data and compression-coded data to/from each telephone, generating compression-coded data by compression-coding the input voice data, and generating voice data by decoding the input compression-coded data. Voice data decoded by this circuit is output to the corresponding telephone. In this embodiment, the CODEC circuit implements compression coding/decoding based on 16-kbps ADPCM (adaptive differential pulse code modulation) and 8-kbps CS-ACELP (conjugate-structure algebraic code-excited linear prediction coding). Upon compression coding, compression-coded data of a voice during a non-vocal activity period is not output under the non-vocal activity control.

The LAN interface 12 inputs/outputs LAN data, detects an IEEE802.3 frame from input LAN data, checks an MAC address and the like by a bridge function based on MAC address learning, and controls data transfer in accordance with the checking result.

Compression-coded data from the telephone channel interface 11 and LAN data from the LAN interface 12 are output to a frame assembler/disassembler 13. The frame assembler/disassembler 13 generates a first frame by multiplexing control data of the adapter 1 together with the input compression-coded data and LAN data onto dynamically assigned time slots, and outputs the first frame to an adapter controller 14. When the frame assembler/disassembler 13 receives a first frame from the adapter controller 14, it disassembles the input first frame into compression-coded data and LAN data, and outputs them to the telephone channel interface 11 and the LAN interface 11, respectively.

The adapter controller 14 has a CPU (not shown), which reads out a program stored in a ROM (not shown) and executes the program to control the entire adapter 1. This control includes transmission/reception control for transmitting the first frame from the frame assembler/disassembler 13 onto the dedicated channel network 3 via a dedicated channel interface 15, and receiving the first frame transmitted from the dedicated channel network 3 via the dedicated channel interface 15, management of the telephone channel interface 11, control of the LAN interface 12 and frame assembler/disassembler 13, and power supply control from a power supply circuit 16 to the individual blocks.

The dedicated channel interface 15 has a function of a terminal adapter, and is connected to the dedicated channel network 3 via a DSU (data service unit) arranged on the dedicated channel network 3 side.

Each node 2 has a second frame assembling function of unwrapping voice data and LAN data from the first frame input via the dedicated channel network 3 and assembling a second frame for exchanging them, a third frame generation function of generating a third frame by segmenting the second frame and assembling the segments, a second frame reassembling function of reassembling a second frame from the third frame, and a first frame reassembling function of reassembling a first frame from the second frame assembled by the second frame reassembling function. Note that the second and third frames will be described in detail later.

More specifically, as shown in FIG. 3, each node 2 has a plurality of adapter interfaces 21 (AD1, ..., ADn), which are connected to the dedicated channel network 3 and implement the second frame assembling function and the first frame reassembling function, a data switch (DS) 22 for exchanging the second frame, a cell relay network interface 23 that implements the third frame generation function and the second frame reassembling function, a public network interface 24 for connecting a plurality of telephone channels and the public network 5, and a controller 25 which controls the entire node 2 in accordance with a program stored in a ROM (not shown), and comprises a microprocessor and the like for performing control of the individual blocks, monitoring of the data switch 22, network management, and the like. The adapter interfaces 21, data switch 22, cell relay network interface 23, public network interface 24, and controller 25 are assigned inherent media numbers uniquely determined in the node 2, and these media numbers are used upon data exchange.

Each adapter interface 21 disassembles the first frame input from the dedicated channel network 3 into voice data and LAN data, and generates second frames respectively for the voice and LAN data. These second frames are output to the data switch (DS) 22. On the other hand, when the adapter interface 21 receives a second frame from the data switch (DS) 22 (to be described below), it unwraps voice or LAN data from the second frame, assembles a first frame including the voice or LAN data, and outputs the first frame onto the dedicated channel network 3.

The data switch 22 comprises a serial crossbar switch and the like. The data switch 22 adds an address and the like corresponding to a unique tag, and performs switching in accordance with the added address value to exchange the second frame input as voice or LAN data. By executing switching in accordance with a predetermined frame format, a second frame for voice data and a second frame for LAN data including LAN and control data are exchanged.

The cell relay network interface 23 generates a third frame by converting the second frames input from the data switch 22 into ATM cells, and outputs the third frame onto the cell relay network 4. Upon receiving a third frame from the cell relay network 4, the interface 23 extracts ATM cells from the third frame, converts the ATM cells into the second frames, and outputs them to the data switch 22.

The public network interface 24 exchanges a voice signal, control signal, and the like with the data switch 22 unlike the cell relay network interface 23, and comprises a PBX (private branch exchange) for connecting a plurality of channels to the public network 5. Hence, the public network interface 24 and the adapter interfaces 21 control to connect a plurality of calls at the same time in some cases.

Figure 7:
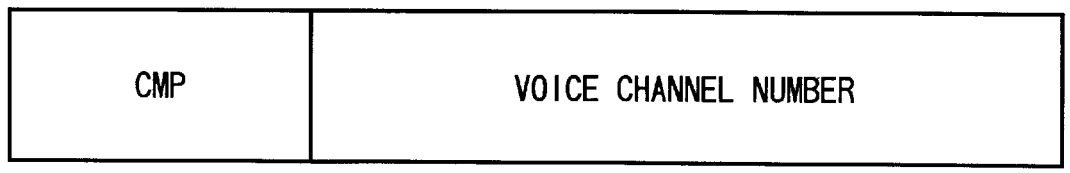
FIG. 7 shows the VCB format of the voice frame shown in FIG. 6.
Figure 8:
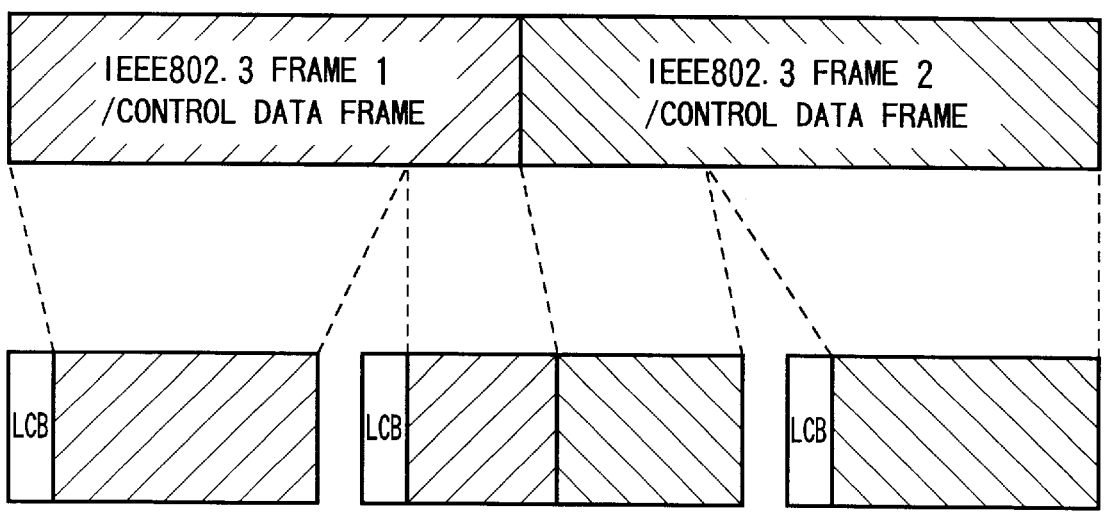
FIG. 8 shows the format of an LD/CD frame in the first frame shown in FIG. 4.
Figure 9:
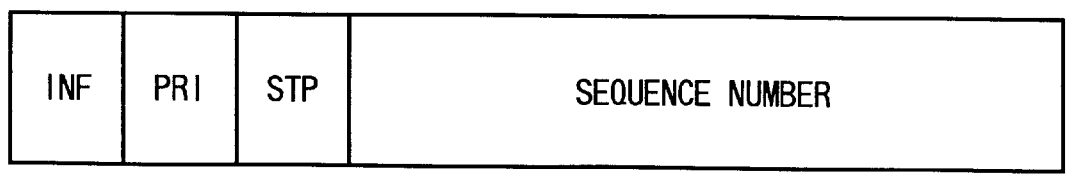
FIG. 9 shows the LCB format of the LD/CD frame shown in FIG. 8.

The processing sequence associated with the first frame transferred between each adapter 1 and node 2 via the dedicated channel network 3 in the multimedia communication system, and the format of the first frame will be described below with reference to FIGS. 4 to 11 in addition to FIGS. 1 to 3. FIG. 4 shows the format of the first frame between each adapter 1 and node 2 via the dedicated channel network 3 in the multimedia communication system shown in FIG. 1, FIG. 5 shows the ID format of the first frame shown in FIG. 4, FIG. 6 shows the format of a voice frame in the first frame shown in FIG. 4, FIG. 7 shows the VCB format of the voice frame shown in FIG. 6, FIG. 8 shows the format of an LD/CD frame in the first frame shown in FIG. 4, FIG. 9 shows the LCB format of the LD/CD frame shown in FIG. 8, FIGS. 10A to 10I show an example of use of "PRI" and "STP" bits in LCB shown in FIG. 9, and FIGS. 11A to 11C show examples of the data formats of the first frame in the multimedia communication system shown in FIG. 1. Note that a case will be exemplified below wherein voice data is compression-coded/decoded by 16-kbps ADPCM (Adaptive Differential Pulse Code Modulation).

When voice data is compression-coded/decoded by 16-kbps ADPCM, if the period of the first frame is 4 ms and the transfer rate of the dedicated channel network 3 is 64 kbps, the length of the first frame is 32 bytes (B) with respect to its period of 4 ms. With this period, 8-bit voice coded data is generated per channel. When the dedicated channel network 3 and adapter 1 are connected at a transfer rate of 64 kbps, the first frame is made up of voice data for two channels, and LAN or control data in association with the length of the datastream to be multiplexed.

More specifically, as shown in FIG. 4, the first frame consists of a fixed-length synchronization byte SYN (to be referred to as an SYN byte hereinafter), which is located at the head of the frame and indicates synchronization information, a block format byte ID (to be referred to as an ID byte hereinafter) which follows the SYN byte and indicates format information of data blocks of the first frame, fixed-length voice frames VD1, . . . , VDn which follow the ID byte and indicate voice data from a plurality of channels, and variable-length LAN data LD/CD (LAN data/control data) which follows these voice frames.

The SYN byte has a 1-byte data length, and is made up of 8 bits "101111110" if it is defined by HDLC (high-level data link control). When the first frame begins to be transferred between a given adapter 1 and a given adapter interface 21 of the corresponding node 2, the SYN byte is detected to establish synchronization, and by repeating the SYN byte detection and synchronization establishment, synchronization during transmission of the first frame is maintained.

The ID byte has a 1-byte data length, and is made up of bits respectively indicating frame identification data for identifying whether the first frame is a normal frame obtained by multiplexing voice frames and LAN data or a test frame used in, e.g., health check or the like, data indicating the number of voice channels included in the first frame, and data indicating the presence/absence of LAN data LD/CD.

More specifically, as shown in FIG. 5, a bit KND indicating the frame identification data is allocated at the head of the byte. If this KND bit is "0", it indicates that the first frame is used as a normal frame; if the KND bit is "1", it indicates that the first frame is used as a test frame. More specifically, when the adapter 1 or the like executes health check, a frame having the same format as the first frame is used as a test frame.

An LI bit that follows the KND bit indicates the presence/absence of LAN data LD/CD, and is valid when the KND bit is "0". If the LI bit is "1", it indicates that the LAN data LD/CD is present in a predetermined time slot; if the LI bit is "0", it indicates the absence of any LAN data LD/CD.

The number of voice channels that follows the LI bit is expressed by a bit pattern. For example, when the dedicated channel network 3 can transfer a maximum of 32 channels of voice frames at a rate of 1.5 Mbps, the number of channels of voice frames included in the first frame can be expressed by a maximum of 5 bits. In this embodiment, since the dedicated channel network 3 transfers a maximum of 2 channels of voice frames at a transfer rate of 64 kbps, the number of channels of voice frames included in the first frame is expressed by 1 bit.

By adding this ID byte to the first frame, the other end-system need not be informed of any message indicating the format of the first frame to be transferred before transmission of the first frame.

The voice frame VD after the ID byte will be explained below.

As shown in FIG. 6, each of the voice frames VD1, . . . , VDn consists of a 1-byte VCB (voice control byte) which is located at the head of the frame, and is used for identifying the compression method of voice data, and an 8-byte voice data block (compression-coded data) VDB generated at 4-ms periods by the 16-kbps ADPCM, and the data length of each voice frame is 9 bytes. Since no voice frame is transferred while a non-vocal activity period is produced after a call is connected, the voice frame length changes at 4-ms periods. In this embodiment, since the number of voice channels is a maximum of "2", the number n of voice frames included in the first frame is "2". When the dedicated channel network 3 has a transfer rate of 128 kbps, a maximum of four channels of voice frames can be transferred in terms of use of the multiplexed datastream length. Furthermore, the VDB is 8-byte data, but its data length varies depending on the CODEC type. For example, when 8-kbps CS-ACELP is used, the VDB has a 4-byte length.

As shown in FIG. 7, the VCB is assigned a bit pattern CMP which is located at the head of the byte and is used for identifying the CODEC type, and a voice channel number for specifying each telephone channel connected to the adapter 1. In this embodiment, since the two types of CODEC, i.e., 16-kbps ADPCM and 8-kbps CS-ACELP are used, the bit pattern CMP is expressed by 1 bit.

The LAN or control data LD/CD will be explained below.

Since LAN or control data LD/CD permits a delay to some extent unlike voice data that requires real-time processing, it is transferred independently of 4 ms as the transfer period of the first frame. More specifically, the LAN or control data LD/CD is divided into data having a predetermined data length, as needed, and one or a plurality of divided data are transferred while being superposed on first frames which are sequentially generated. For example, when a transfer request of a total of two frames, e.g., two IEEE802.3 frames or one IEEE802.3 frame and one control data frame is generated, the two frames must be segmented into a plurality of data, so that these divided data are transferred while being superposed onto first frames. However, as described above, since the voice frame area changes upon producing a non-vocal activity period after a call is connected or when the call is released, the usable length of the LAN data LD/CD also changes. Hence, the LAN or control data LD/CD is added a 1-byte LCB (LAN/control data control byte) for controlling division, as shown in FIG. 8.

As shown in FIG. 9, this LCB is made up of an INF bit located at the head of the byte, PRI and STP bits that follow the INF bit, and a sequence number that follows the STP bit. The INF bit identifies whether data in this field is user's LAN data or control data between the adapter 1 and node 2. If this bit is "0", it indicates LAN data; if this bit is "1", it indicates control data.

The PRI bit indicates data priority, and is used, for example, when data to be urgently sent in terms of system performance is generated during transfer of data having a considerably long data length, and the data must be sent by interrupting the transfer of the long data, or when performance is expected to deteriorate in terms of delay in call control of the telephone. If the PRI bit assumes a value "0", it indicates low priority; if it assumes a value "1", it indicates high priority. The STP bit indicates the last block of the divided data. If this bit is "1", it indicates the last block of the divided data; if this bit is "0", it indicates a block other than the last block. The sequence number that follows the STP bit is toggle information for monitoring continuity of the divided LAN/CD data.

FIGS. 10A to 10I show an example wherein control data with high priority for four cycles interrupt the first frame at 4-ms periods during transfer of LAN or control data LD/CD with low priority. As can be seen from FIGS. 10A to 10I, during transfer of the LAN data LD/CD with low priority, the PRI and STP bits are respectively set at "0" (see FIGS. 10A and 10B). When an interrupt of control data with high priority is generated, the PRI bit for the interrupting data is set at "1" (see FIGS. 10C, 10D, 10E, and 10F), and in the last block of that data, the STP bit is set at "1" while holding the PRI bit at "1" (see FIG. 10F). Upon completion of the interrupt of the control data with high priority, the transfer of the LAN data LD/CD with low priority is restarted, and the PRI and STP bits are respectively set at "0" again (see FIGS. 10G and 10H). When the last block of the LAN data LD/CD with low priority is transferred, the STP bit is set at "1" while holding the PRI bit at "0" (see FIG. 10I).

As described above, the adapter 1 and node 2 transfer first frames via the dedicated channel network 3 while changing its data format at 4-ms periods in correspondence with the number of voice channels, the presence/absence of voice frames controlled by the non-vocal activity control, and the presence/absence of LAN data LD/CD. For example, when voice frames for two channels are present, first frame format example 1 shown in FIG. 11A is used. When a voice frame for one channel alone is present, first frame format example 2 shown in FIG. 11B is used. On the other hand, when no voice frame is present, first frame format example 3 shown in FIG. 11C is used. As can be seen from these examples, the transfer volume of LAN data LD/CD changes in correspondence with the number of voice channels and the presence/absence of voice frames, and can be increased as the number of voice channels decreases or when no voice frame is present.

As described above, statistical multiplexing is used to transfer voice frames and LAN data LD/CD effectively using the multiplexed datastream length. Since such dynamic time slot assignment is done for frames at 4-ms periods, voice frames and LAN data LD/CD can be efficiently transferred in a predetermined span of time.

FIG. 23 depicts changes in transfer volume of voice data and LAN data LD/CD in units of frames.

In FIG. 23, the voice data and LAN data LD/CD are illustrated using different patterns. In the initial first frame, voice frames for two channels are transferred as in FIG. 11A. In the next first frame, transfer of voice frames for the two channels are simultaneously stopped, and LAN data occupy all time slots, as in FIG. 11C. In the next first frame, as in FIG. 11B, a voice frame for one of the two channels is transferred. In first frames for the subsequent three cycles, both voice frames for the two channels and LAN data LD/CD are transferred, as in FIG. 11A. Thereafter, a voice frame for one of the two channels is transferred, and the remaining time slots are used for transferring LAN data LD/CD, as in FIG. 11B. First frames for the subsequent two cycles are used by voice frames for the two channels and LAN data LD/CD as in FIG. 11A.

As can be seen from the above description, the transfer volumes of voice frames and LAN data LD/CD dynamically change in a predetermined span of time.

Furthermore, since the first frame is added information (the ID byte in this embodiment) indicating the number of voice channels (VD) and the presence/absence of LAN data LD/CD, the other end-system need not be notified of a change in format of the first frame in advance.

Figure 12:
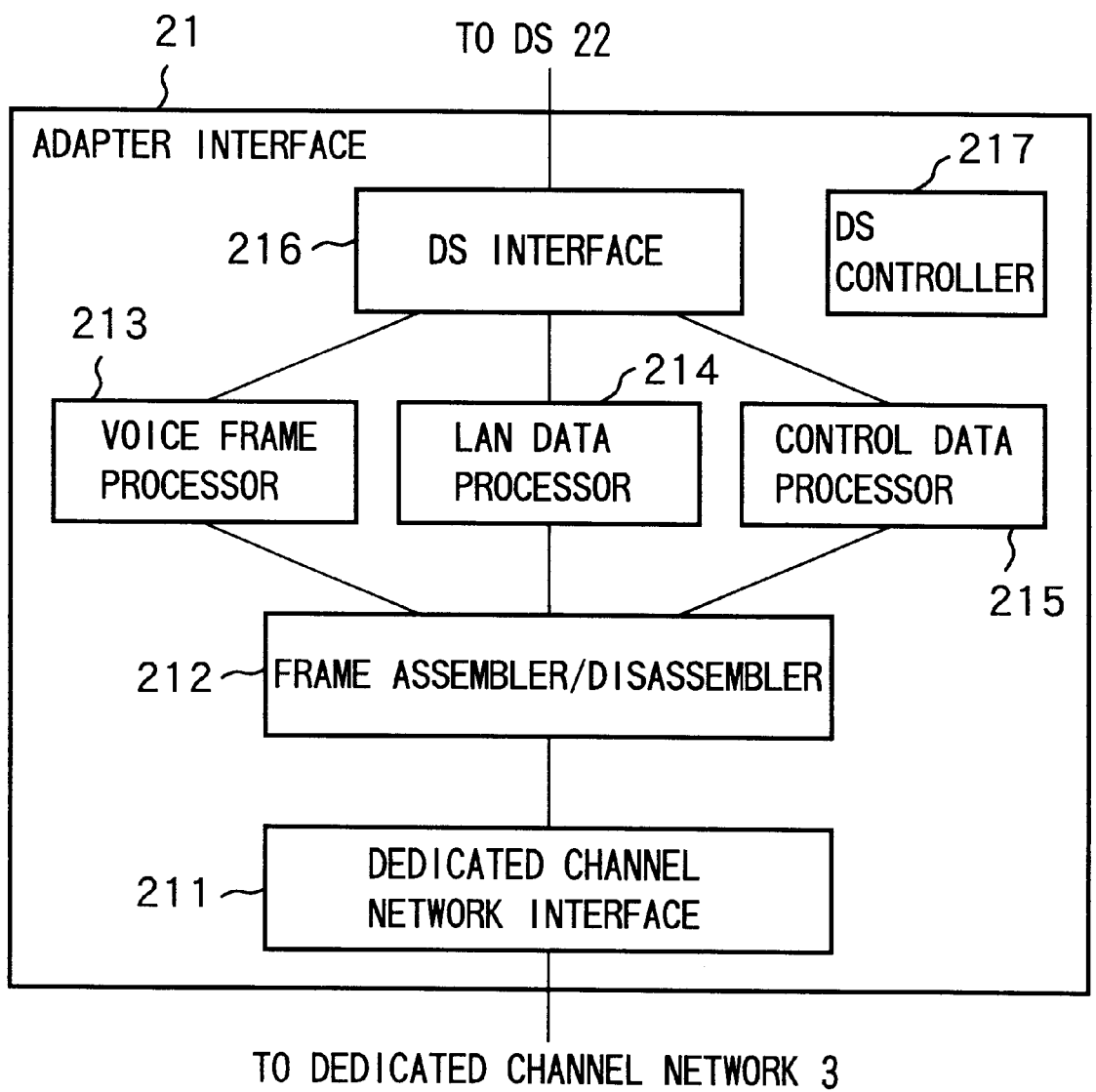
FIG. 12 is a block diagram showing the arrangement of an adapter interface in the node shown in FIG. 3.
Figure 15:
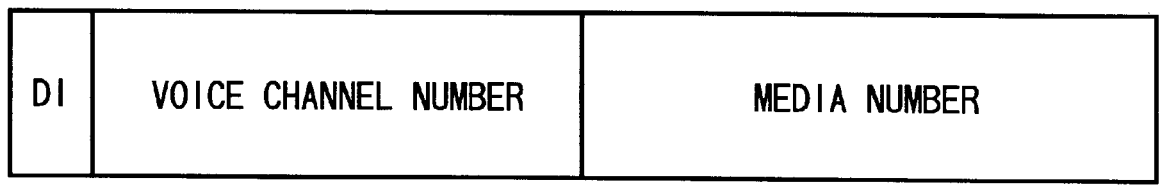
FIG. 15 shows the data format of a terminal number included in the voice and LAN/CD packets.
Figure 16:
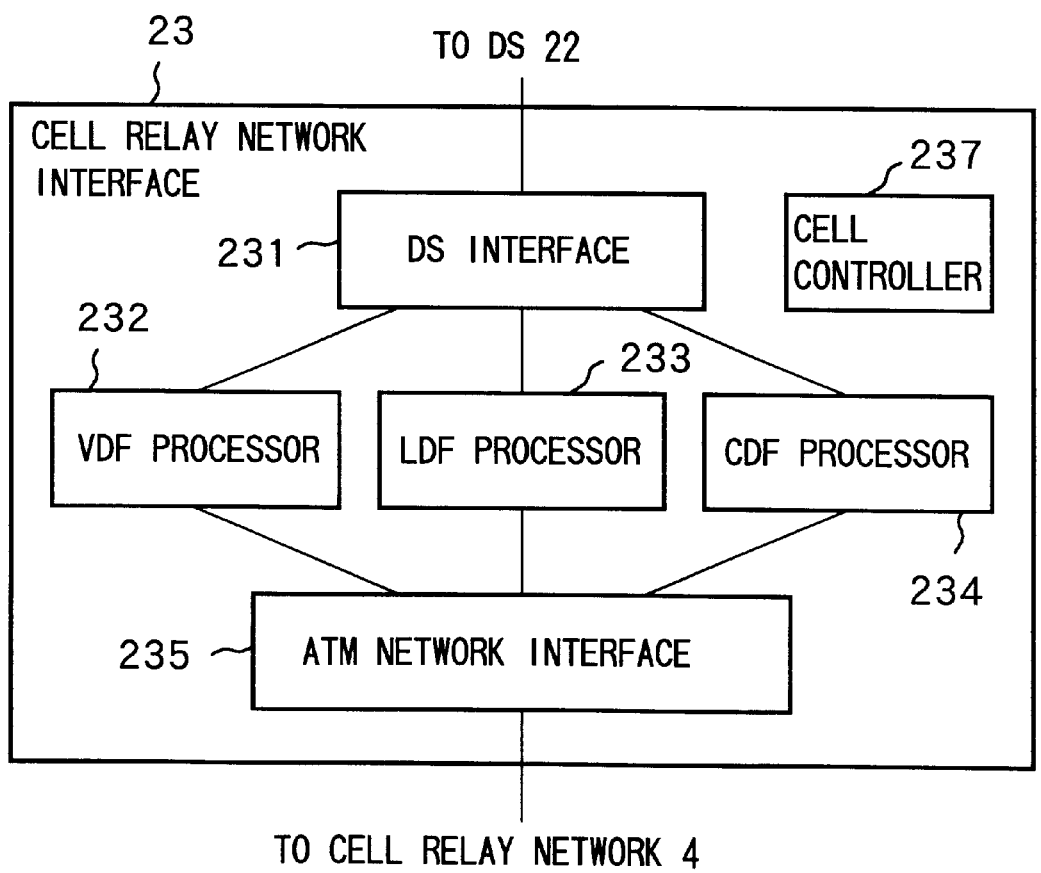
FIG. 16 is a block diagram showing the arrangement of a cell relay network interface in the node shown in FIG. 3.
Figure 17:
FIG. 17 shows the format of a VD data frame assembled by the cell relay network interface shown in FIG. 16.
Figure 18:
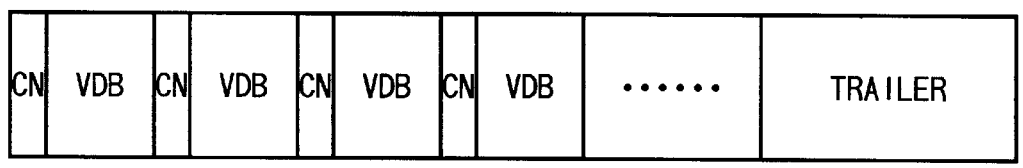
FIG. 18 shows the format of a PDU that concatenates the VD data frames shown in FIG. 17.
Figure 19:
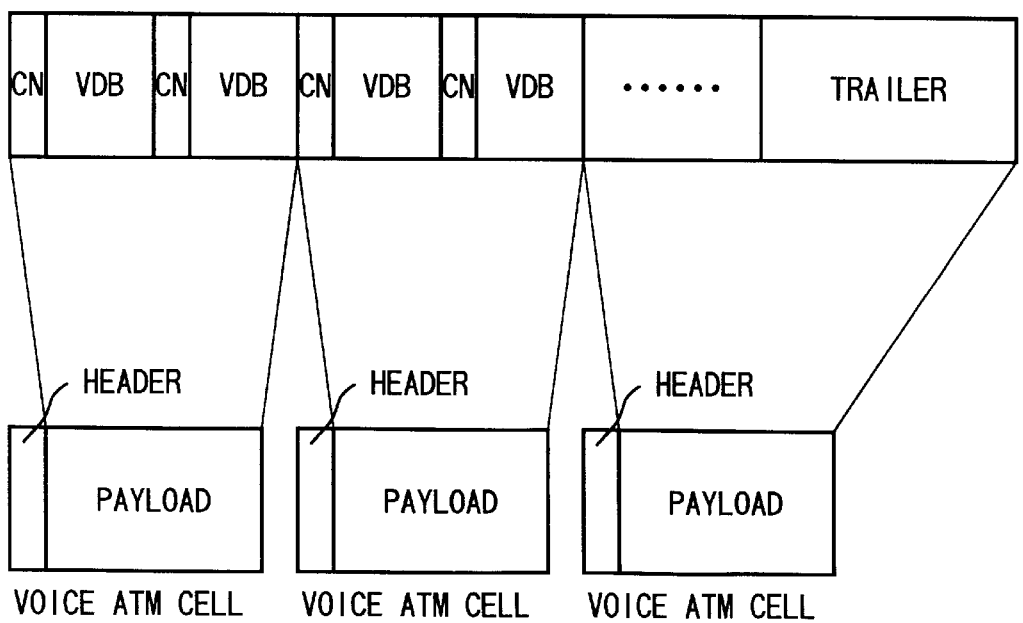
FIG. 19 shows an assembling example of voice ATM cells.
Figure 20:
FIG. 20 shows the format of a LAN data LD/CD frame assembled by the cell relay network interface shown in FIG. 16.
Figure 21:
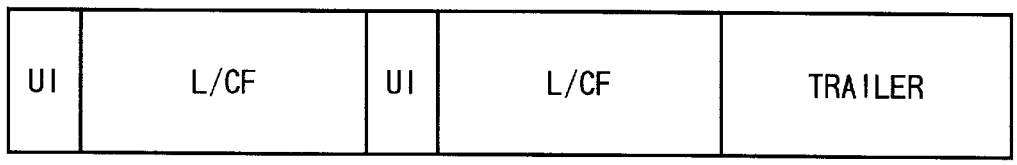
FIG. 21 shows the format of a PDU that concatenates the LAN data LD/CD frames shown in FIG. 20.
Figure 22:
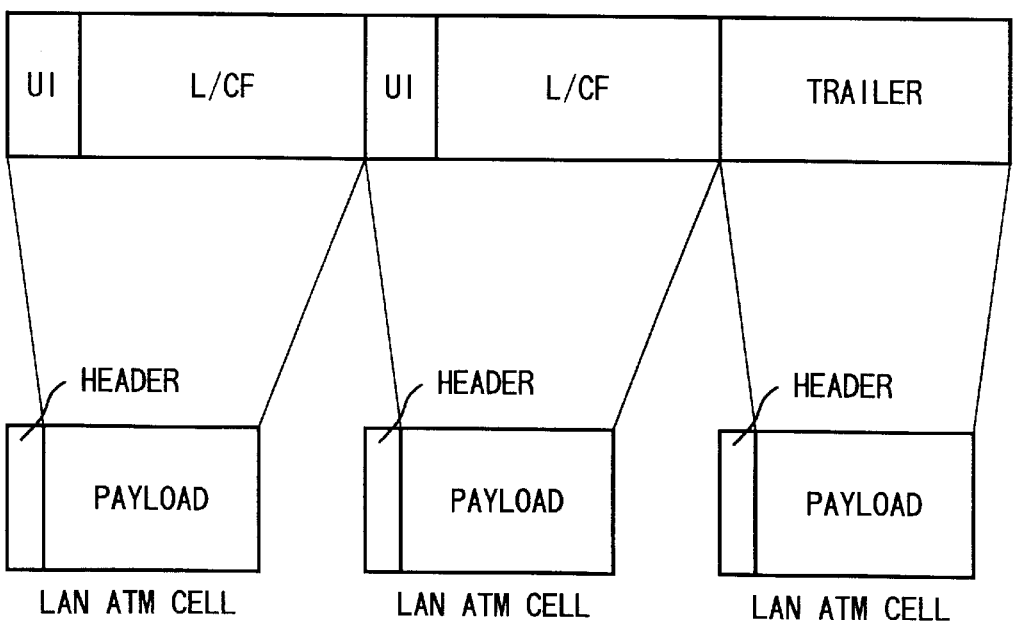
FIG. 22 shows an assembling example of LAN ATM cells.

The sequence from reception of a first frame in the node 2 in this multimedia communication system until transfer onto the cell relay network 4, and the formats of the second and third frames used in the node 2 will be described below with reference to FIGS. 12 to 22. FIG. 12 is a block diagram showing the arrangement of each adapter interface 21 in the node 2 shown in FIG. 3, FIGS. 13A and 13B show the formats of voice packets (second frames) exchanged by the data switch 22 in the node 2 shown in FIG. 3, FIGS. 14A and 14B show the formats of LAN/CD packets (second frames) exchanged by the data switch 22 in the node 2 shown in FIG. 3, FIG. 15 shows the data format of a terminal number included in the voice and LAN/CD packets, FIG. 16 is a block diagram showing the arrangement of the cell relay network interface 23 in the node 2 shown in FIG. 3, FIG. 17 shows the format of a VD data frame assembled by the cell relay network interface 23 shown in FIG. 16, FIG. 18 shows the format of a PDU that concatenates the VD data frames shown in FIG. 17, FIG. 19 shows an assembling example of voice ATM cells, FIG. 20 shows the format of a LAN data LD/CD frame assembled by the cell relay network interface 23 shown in FIG. 16, FIG. 21 shows the format of a PDU that concatenates the LAN data LD/CD frames shown in FIG. 20, and FIG. 22 shows an assembling example of LAN ATM cells.

The arrangement of each adapter interface 21 in the node 2 and the sequence until conversion into a second frame used for exchanging the received first frame will be described below with reference to FIGS. 12 to 15.

When a first frame is transferred from one adapter 1 via the dedicated channel network 3, it is received by the corresponding adapter interface 21 of the node 2. In the adapter interface 21, as shown in FIG. 12, a dedicated channel network interface 211 unwraps data, and reconstructs a first frame (shown in FIG. 4) at 4-ms periods.

The first frame is supplied to a frame assembler/disassembler 212. Since the first frame includes voice frames (VD1, . . . , VDn; shown in FIG. 6) and LAN or control data LD/CD, as described above, the frame assembler/disassembler 212 disassembles the first frame into the voice frames and LAN or control data LD/CD frames on the basis of the ID byte in the first frame. Each voice frame is supplied to a voice frame processor 213, each LAN data is supplied to a LAN data processor 214, and each control data is supplied to a control data processor 215.

Upon receiving the voice frame, the voice frame processor 213 converts the VCB byte (shown in FIG. 7) at the head of this voice frame into a terminal number which includes data including a channel number in the VCB byte, and a media number assigned to each block in the node 2, and generates a voice packet (a second frame of voice data) including this terminal number. The voice packet is made up of the terminal number and VDB (shown in FIG. 6), as shown in FIG. 13A. Note that the format of the terminal number will be explained later.

The LAN or control data processor 214 or 215 stores LAN or control data LD or CD stripped from the first frame, and assembles a plurality of stored data using the LCB byte (shown in FIG. 8), thereby reconstructing a LAN data LD frame (IEEE802.3 frame) or control data CD frame. Each reconstructed frame is added a terminal number and user ID, as shown in FIG. 14A, thus generating an LD/CD packet (a second frame of LAN data). This user ID represents an ID for specifying a system supervisor who uses control data, when data included in the packet is the control data. In case of LAN data, the user ID represents an ID assigned in units of LAN users.

The terminal number added to each of the second frames of the voice and LD/CD packets is made up of a DI bit, voice channel number, and a media number assigned to each block in the node 2, as shown in FIG. 15. The DI bit indicates terminal identification information for identifying whether a packet added this terminal number is a voice or LD/CD packet, and is set at "0" for a voice packet or is set at "1" for an LD/CD packet. The voice channel number is the same as that indicated by the VCB shown in FIG. 7. If the DI bit is "1", the area of the voice channel number becomes an empty data area, and is ignored at the data receiver.

Packets generated by the voice frame processor 213, LAN data processor 214, and control data processor 215 are supplied to a DS interface 216. The DS interface 216 packages the input packets into packets that can be exchanged by the data switch 22. More specifically, a voice packet is encapsulated into a voice packet which is added a DS address at the head of the packet, and EOP (end of packet) at the end of the packet, as shown in FIG. 13B. Likewise, an LD/CD packet is encapsulated into an LD/CD packet which is added a DS address at the head of the packet, and EOP (end of packet) at the end of the packet, as shown in FIG. 14B. The DS address indicates an exchange destination required in packet exchange by the data switch 22, and the EOP is a bit which serves as both identification of the end of the packet, and a CRC of block check for the packet.

The DS interface 216 packages the packets supplied from the voice frame processor 213, LAN data processor 214, and control data processor 215 into packets that can be exchanged by the data switch 22, and outputs the obtained packets to the data switch 22. The processing for inputting, converting, and outputting a voice packet is executed within a 4-ms period, and the processing for inputting, converting, and outputting a LAN/CD packet is executed using an interval between adjacent voice packet processing periods.

A DS controller 217 executes control and management for the individual blocks including the control for this packet processing of the DS interface 216. The DS controller 217 exchanges data used in the control of the adapter interface 21 with other controllers as needed.

Upon receiving a packet from the DS interface 216, the data switch 22 performs switching to output that packet to the exchange destination on the basis of the DS address added to the packet. Since the destination which received the packet does not require any DS address, the switch 22 deletes the DS address. In this manner, the DS address is used as a transiently valid value.

Packets are exchanged: from one of the adapter interfaces 21 to another adapter interface 21 in a single node 2; from one of the adapter interfaces 21 to the cell relay network interface 23 or from one of the adapter interfaces 21 to the public network interface 24 in a single node 2; from the cell relay network interface 23 to one of the adapter interfaces 21 or from the public network interface 24 to one of the adapter interfaces 21 in a single node 2.

For example, when a packet is sent from one of the adapter interfaces 21 to another adapter interface 21 in a single node 2 via the data switch 22, the adapter interface 21 that is to receive the packet executes processing opposite to that for outputting a packet to the data switch 22. That is, when the adapter interface 21 receives a voice packet, it inversely converts the terminal number into the VCB byte shown in FIG. 6 using a table or the like prepared in advance, and generates a voice packet shown in FIG. 13A. This voice packet is packaged into a first frame which is then output to the corresponding adapter 1 via the dedicated channel network 3. The adapter 1 connects a call to the corresponding channel, and decodes and outputs voice data. Upon receiving an LD/CD packet, the adapter interface 21 checks the user ID and terminal number, then assembles a first frame using that LD/CD packet, and outputs the first frame to the corresponding adapter 1. When data included in the first frame is LAN data LD, the adapter 1 reconstructs the data as an IEEE802.3 frame, and outputs that frame to the destination via an Ethernet interface. On the other hand, when data included in the first frame is control data CD, the adapter 1 executes internal control in accordance with that data.

When a packet is sent from one of the adapter interfaces 21 to the public network interface 24 via the data switch 22, the public network interface 24 checks the destination port connected to the public network 5 on the basis of the terminal number added to that packet using a table or the like, decodes the voice data block VDB, and outputs the decoded voice data onto the public network 5 via the PBX.

The processing of the cell relay network interface 23 for a packet received from one of the adapter interfaces 21 via the data switch 22 will be described below with reference to FIGS. 16 to 22.

When a packet is sent from the adapter interface 21 to the cell relay network interface 23 via the data switch 22, the packet is fetched by a DS interface 231, as shown in FIG. 16. Upon fetching a voice packet, the DS interface 231 deletes its DS address, and thereafter, outputs the voice packet to a VDF processor 232. Upon fetching an LD/CD packet, the interface 231 deletes its DS address, and thereafter, outputs a LAN packet to an LDF processor 233 and a control packet to a CDF processor 234.

The VDF, LDF, and CDF processors 232, 233, and 234 execute ATM cell formation processing required for outputting data in the received packets onto the cell relay network 4. Since this ATM cell formation processing concatenates such data and outputs the concatenated data onto the cell relay network, the control data volume is required to be minimized, and the individual processors execute processing to meet such requirement.

More specifically, the VDF processor 232 converts the terminal number included in the received voice packet (shown in FIG. 13A) into a 1-byte connection number (CN) using a table prepared in advance, and creates a VD data frame which is added this connection number at the head thereof. The terminal number is information required for switching control of the data switch 22 in the node 2. However, since information to be added after a call connection must be minimized for the cell relay network 4 which is used at a limited service rate or less, the terminal number is converted into the connection number. The table stores correspondence between the terminal number and connection number, and is generated in advance upon connecting a call between the nodes.

As shown in FIG. 17, the VD data frame is made up of a connection number (CN) and a VDB that follows the CN. As described above, since voice packets upon connecting one call are sent at 4-ms periods, control for generating and processing VD data frames at this interval is executed. Subsequently, the VD data frames are stored at predetermined periods, and a plurality of stored VD data frames are concatenated and are adapted to a PDU (protocol data unit) as a data block unit on the communication protocol. The PDU that concatenates the VD data frames is made up of a plurality of VD data frames and a trailer used for adjusting the data length of the PDU, as shown in FIG. 18. The data length of the PDU is set at an integer multiple of 48 bytes as the payload field length of an ATM cell, and the trailer is added to the end of the PUD, so that the data length of the PDU equals an integer multiple of 48 bytes.

The PDU that concatenates the VD data frames is output to an ATM network interface 235. The ATM network interface 235 breaks up the PDU that concatenates the VD data frames into 48-byte payloads to generate ATM cells complying with user service requirements. More specifically, as shown in FIG. 19, the PDU that concatenates the VD data frames are divided into a plurality of 48-byte payloads, and a 5-byte header that stores a prescribed value is added to each divided payload. The divided payloads with headers are output onto the cell relay network 4 as voice ATM cells (third frames).

Upon receiving an LD/CD packet shown in FIG. 14A, the LDF or CDF processor 233 or 234 converts the packet into a LAN data LD/CD frame basically including a user ID and a LAN data LD frame (IEEE802.3 frame) or control data CD frame, since the terminal number of that packet is not required in the cell relay network 4. More specifically, as shown in FIG. 20, the LAN data LD/CD frame is made up of a user ID (UI) at the head of the frame, and a LAN data LD frame (IEEE802.3 frame)/control data CD frame (L/CF) that follows the UI. LAN data LD/CD frames are stored at predetermined periods, and a plurality of stored frames are concatenated and converted into a PDU. As shown in FIG. 21, the PDU is made up of a plurality of LAN data LD/CD frames and a trailer for adjusting the data length of the PDU, as in the PDU that concatenates VD data frames, and the data length of the PDU is adjusted to an integer multiple of 48 bytes as the payload area length of an ATM cell by adding the trailer.

The PDU that concatenates the LAN data LD/CD frames is output to the ATM network interface 235, which divides the PDU that concatenates the LAN data LD/CD frames into 48-byte payloads to generate ATM cells complying with user service requirements. More specifically, as shown in FIG. 22, the PDU that concatenates the LAN data LD/CD frames are divided into a plurality of 48-byte payloads, and a 5-byte header that stores a prescribed value is added to each divided payload. The divided payloads with headers are output onto the cell relay network 4 as LAN ATM cells (third frames).

In this manner, LAN ATM cells are transmitted while transmitting/receiving voice ATM cells in real time, thus maintaining real-time characteristics of voice data.

When a destination node 2 receives ATM cells sent via the cell relay network 4, that node 2 converts the received ATM cells into corresponding voice frames or LAN data frames by processing opposite to the above-mentioned ATM cell transmission, assembles a first frame using the converted frames, and transfers the first frame to the corresponding adapter 1 and the like.

As described above, in the communication system of this embodiment, the adapter 1 as the transmitter converts voice data from the connected telephones and LAN data from the LAN terminal into a first frame by multiplexing them in time slots which are dynamically assigned using statistical multiplexing, and transfers the first frame to the node 2 via the dedicated channel network 3 without informing the destination of the format of the first frame in advance. The node 2 disassembles the input first frame into voice data and LAN data, and assembles a voice packet or LD/CD packet (second frame) using these data to exchange such packet. Thereafter, the node 2 disassembles and reassembles that packet to generate voice or LAN ATM cells (third frame) and transfers them to the destination node 2 via the cell relay network 4. Upon receiving the ATM cells sent via the cell relay network 4, the node 2 converts the received ATM cells into voice or LAN data frames to assemble a first frame by processing opposite to the above-mentioned ATM cell transmission, and transfers the first frame to the corresponding adapter 1 and the like. Hence, data can be transmitted by simultaneously connecting multipoints. Also, a connection to the public network 5 can be done, and voice data can be used while maintaining its real-time characteristics upon transmitting LAN data.

A retransmission timer set between the adapter 1 and node 2 will be explained below.

Figure 24:
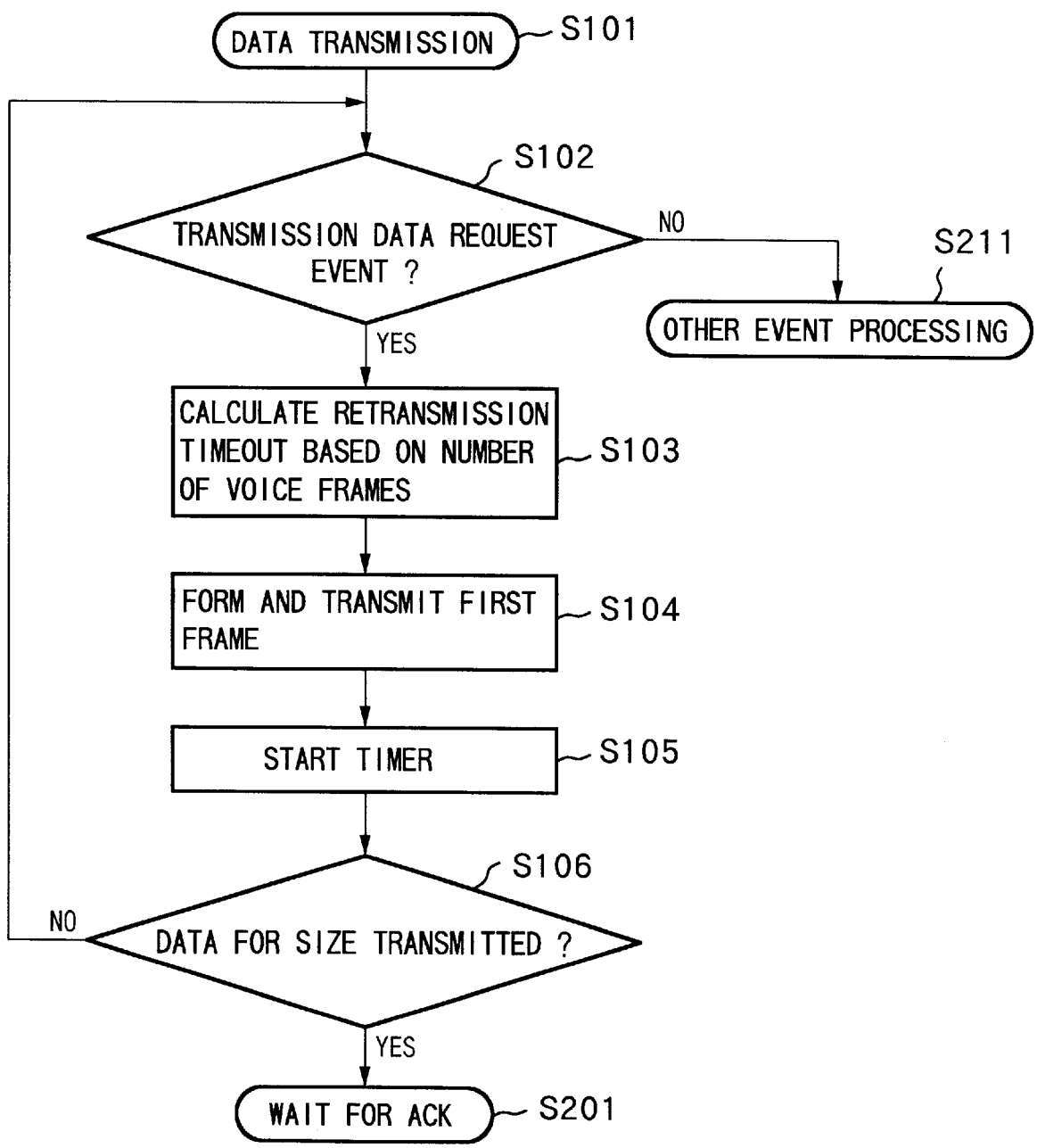
FIG. 24 is a flow chart showing the processing upon determining the retransmission timeout time.
Figure 27:
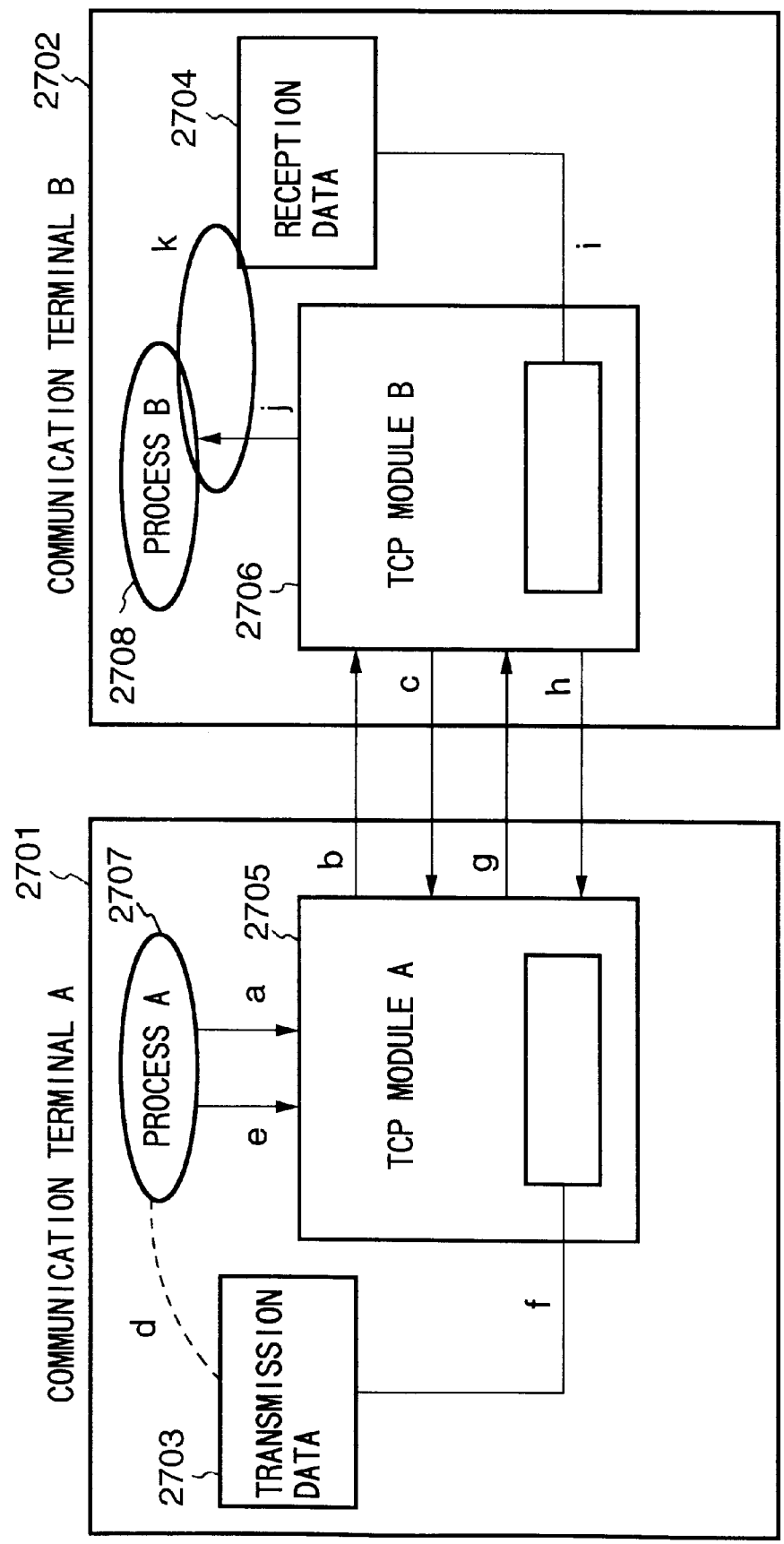
FIG. 27 is a block diagram showing the arrangement around a TCP module of a conventional communication terminal.

FIG. 24 is a flow chart showing the control sequence of the adapter controller 14 in the adapter 1 and the DS controller 217 of the adapter interface 21 in the node 2, and FIG. 25 is an explanatory view showing tables for determining the retransmission timeout time.

Note that this table is stored in memories such as the RAMs of the adapter controller 14 and the DS controller 217. These memories also store the number of voice frames used in the first frame.

Referring to FIG. 24, step S101 corresponds to a state wherein data from a higher layer is being transmitted. For example, in this state, FTP communications are in progress from the adapter 1 to the node 2 or vice versa. Note that the sequence before this step is the same as that in the prior art, and a detailed description thereof will be omitted.

In step S102, the presence/absence of a request or message (event) to the adapter controller 14 or DS controller 217 is checked. If the detected request or message is not a data transmission request, other event processing is done in step S211.

On the other hand, if a data transmission request is detected, the retransmission timeout time is determined on the basis of the transfer rate of the transmission path used and the number of voice frames using the tables shown in FIG. 25 (step S103). Note that the number of voice frames is written by an application program that controls a telephone call in a portion of the above-mentioned memory. Also, the adapter controller 14 or DS controller 217 can look up this memory area.

In step S104, a first frame is output. At the same time, the retransmission timeout time determined in step S103 is set in a timer (step S105).

It is then checked if transmission for the size of the first frame is complete (step S106). If the transmission is complete, the control transmits to an ACK wait state (step S201). On the other hand, if the transmission is not complete yet, the control returns to step S102 to continue data transmission.

On the other hand, if it is determined in step S102 that the event is other than the data transmission request, the same processing as in the prior art is done, and a detailed description thereof will be omitted.

In the tables shown in FIG. 25, ALPHA and BETA factors are the basically same as those in the prior art.

In this case, values upon multiplexing a maximum of two channels of telephones in case of a 64-kbps channel and a maximum of four channels of telephones in case of a 128-kbps channel to a single IP packet communications are prepared. These values are set by reflecting some communication results (communication results without frequently reaching timeout states).

Second Embodiment

Another embodiment associated with setting of a retransmission timer will be explained below.

Figure 31:
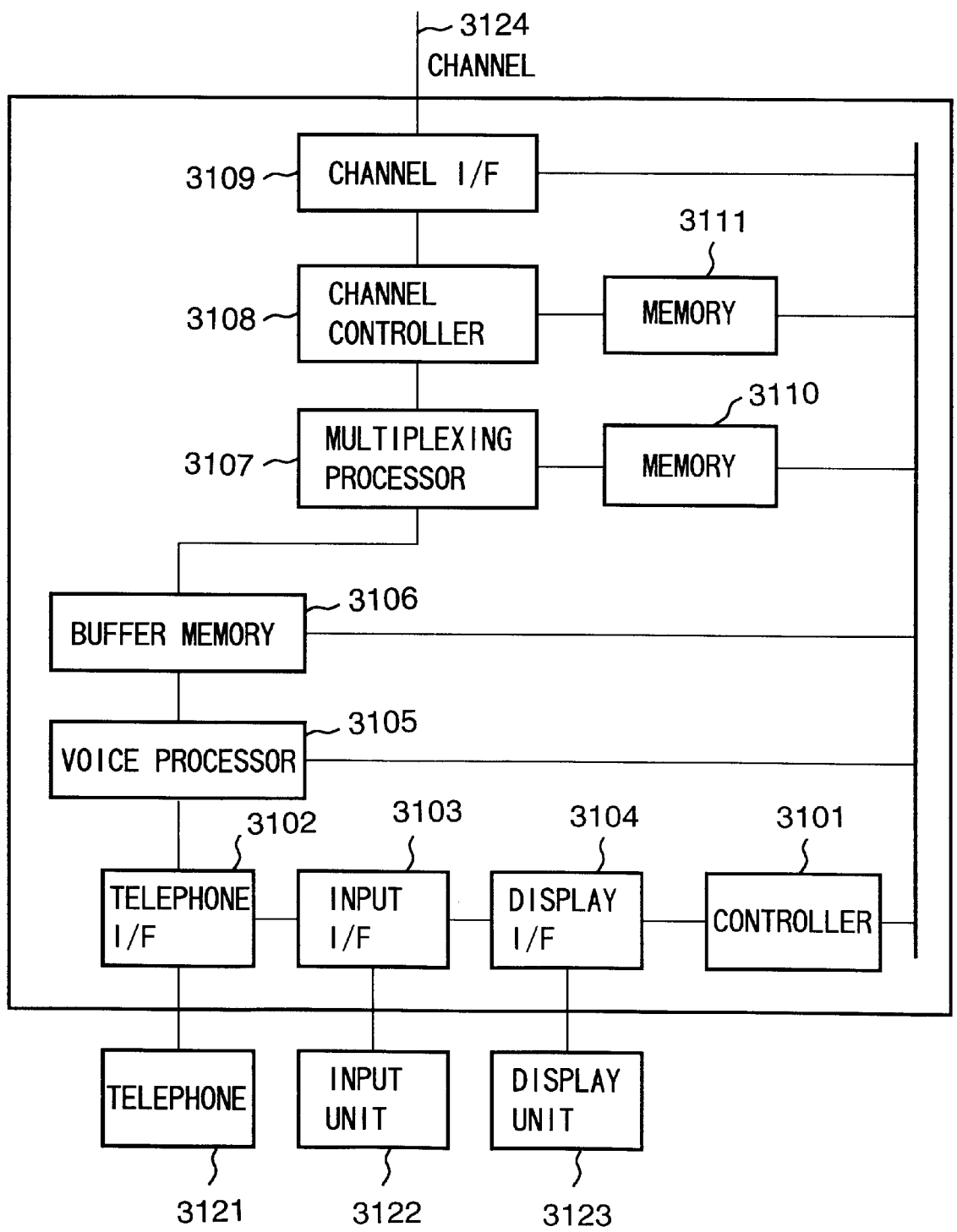
FIG. 31 is a block diagram showing the second embodiment of the present invention.

FIG. 31 is a block diagram showing the arrangement of a multiplexing communication apparatus in this embodiment.

A controller 3101 comprises, e.g., a microprocessor, and controls the entire apparatus. A telephone interface 3102 accommodates an analog telephone or ISDN telephone 3121.

An input interface 3103 receives an input signal from the user via an input unit 3122 such as a keyboard, mouse, or the like. A display interface 3104 interfaces a display unit 3123, and a voice data processor 3105 encodes/decodes voice data in case of, e.g., an analog telephone.

A buffer memory 3106 temporarily stores various data. A multiplexing processor 3107 multiplexes telephone data with other application data. A channel controller 3108 controls a channel that connects its own apparatus and the apparatus on the other end. A channel interface 3109 interfaces a channel.

A memory 3110 stores the number of telephone channels, and the like, and a memory 3111 stores control information including a program that describes the operation of the controller 3101, and the like.

Figure 32:
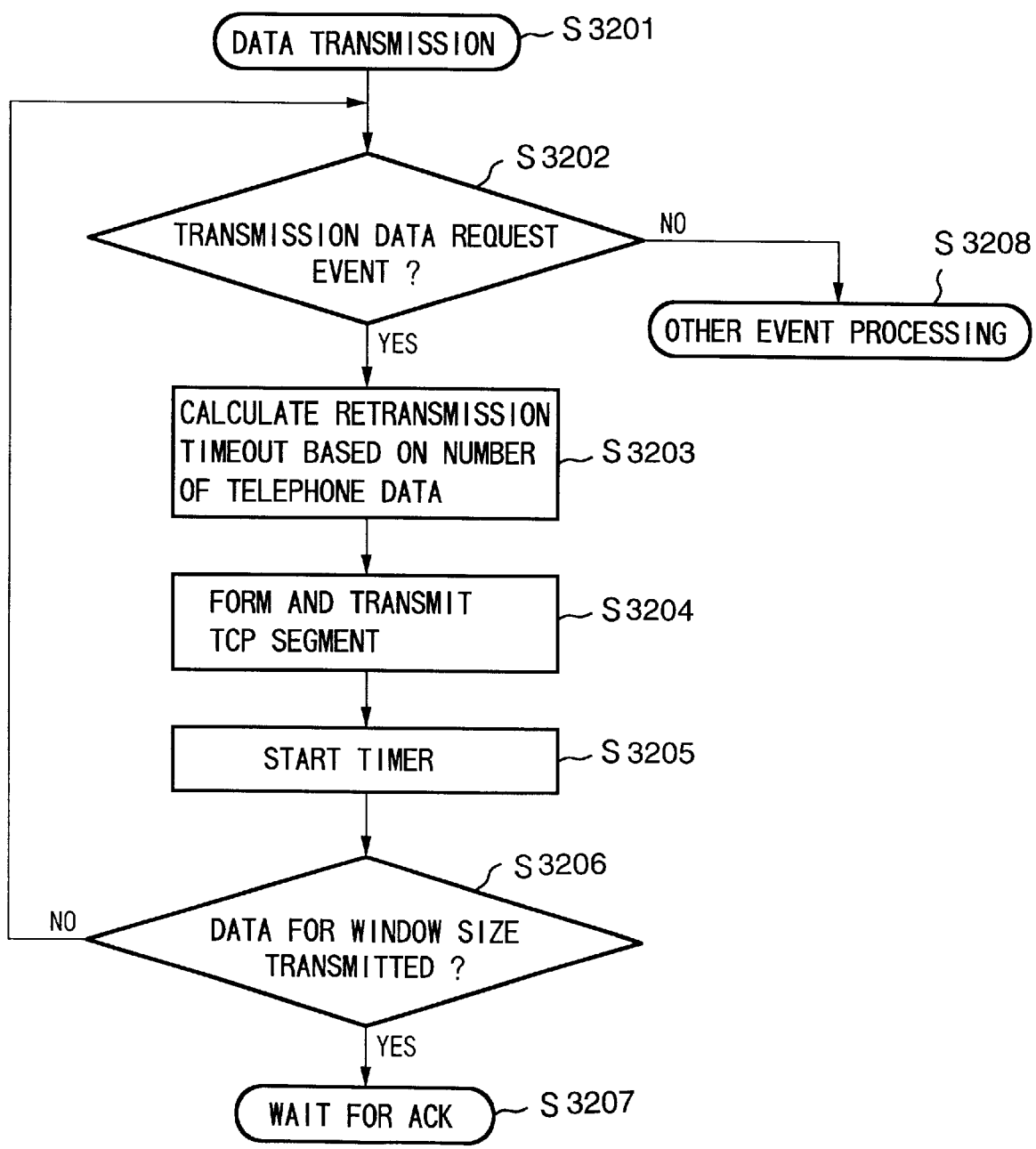
FIG. 32 is a flow chart showing the control sequence of a TCP module as a portion of control information in the second embodiment.

FIG. 32 is a flow chart showing the control sequence of a TCP module as a portion of control information, and FIG. 33 is an explanatory view showing tables for determining the retransmission timeout time.

Step S3201 corresponds to a state wherein data from a higher layer is being transmitted. For example, in this state, the user is performing FTP communications using the input unit 3122 and display unit 3123. Note that the sequence before this step is the same as that in the prior art, and a detailed description thereof will be omitted.

In step S3202, the presence/absence of a request or message (event) to this module is checked. If the detected request or message is not a data transmission request, other event processing is done in step S3208.

On the other hand, if a data transmission request is detected, the retransmission timeout time is determined on the basis of the transfer rate of the transmission path used and the number of telephone channels using the tables shown in FIG. 33 (step S3203). Note that the number of telephone channels is written in a portion of the memory 3110 by an application program that controls a telephone call. The TCP module can look up that area of the memory 3110.

Figure 29:
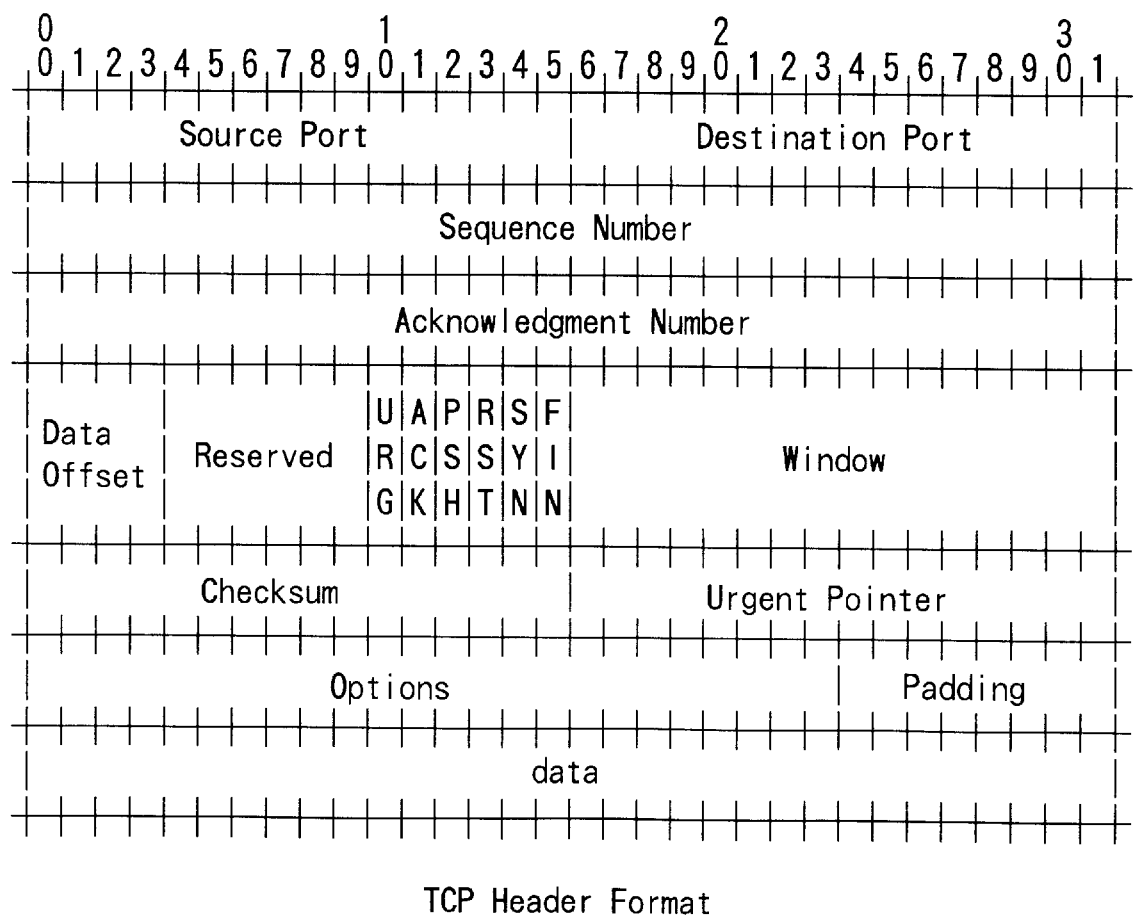
FIG. 29 is an explanatory view showing the format of a conventional TCP header.
Figure 30:
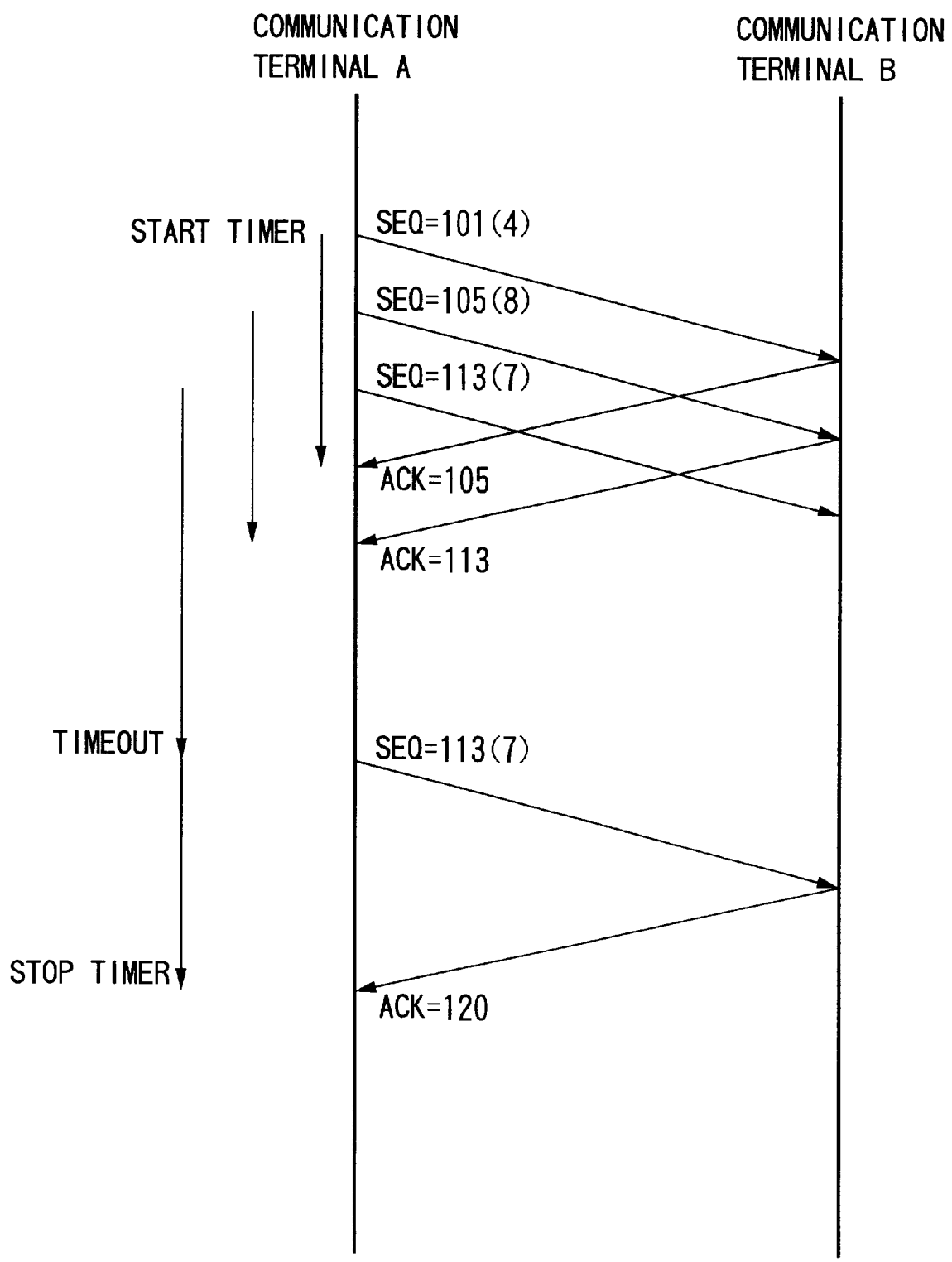
FIG. 30 is an explanatory view showing retransmission and the window size in the conventional TCP module.

In step S3204, a header shown in FIG. 29 is formed and output. At the same time, the retransmission timeout time determined in step S3203 is set in a timer (step S3205).

It is then checked if transmission for the window size is complete (step S3206). If the transmission is complete, the control transmits to an ACK wait state (step S3207). On the other hand, if the transmission is not complete yet, the control returns to step S3202 to continue the data transmission.

On the other hand, if it is determined in step S3202 that the event is other than the data transmission request, the same processing as in the prior art is done, and a detailed description thereof will be omitted.

In the tables shown in FIG. 33, ALPHA and BETA factors are the basically the same as those in the prior art.

In this case, values upon multiplexing a maximum of two channels of telephones in case of a 64-kbps channel and a maximum of four channels of telephones in case of a 128-kbps channel to a single IP packet communications are prepared. These values are set by reflecting some communication results (communication results without frequently reaching timeout states).

As described above, according to the present invention, multipoints can be connected at the same time.

Also, according to the present invention, real-time and non-real-time data can be simultaneously transmitted while maintaining the real-time characteristics of real-time data.

Furthermore, according to the present invention, in a multiplexing communication system that dynamically assigns time slots, the timeout time used for determining retransmission can be set at an appropriate value on the basis of the time slot assignment.

Moreover, according to the present invention, in a multiplexing communication system that dynamically assigns time slots, a message indicating changes in format of a communication frame need not be supplied to the other end.

As many apparently widely different embodiments of the present invention can be made without departing from the spirit and scope thereof, it is to be understood that the invention is not limited to the specific embodiments thereof except as defined in the appended claims.

What is claimed is:

1. A communication system having first and second communication apparatuses, and communicating a communication frame obtained by time-division multiplexing a plurality of communication data, said first communication apparatus comprising:
recognition means for recognizing communication states for each of different types of data in case where data of a first type and data of a second type, which is different from the first type, are communicated by the communication frame;
communication frame assembling means for assembling the communication frame on the basis of a recognition result of said recognition means, and adding information based on the communication states for each type of data to the communication frame; and
transmission means for transmitting the communication frame to said second communication apparatus, and said second communication apparatus comprising:
acquisition means for acquiring communication data on the basis of the information added to the communication frame and transmitted by said transmission means; and
generating means for generating a plurality of secondary frames of a single data type by converting the communication frame using the added information and for generating a third frame by converting at least one of the plurality of secondary frames, wherein said third frame is configured to interface with a predetermined network.

2. A communication apparatus for communicating a communication frame obtained by time-division multiplexing a plurality of communication data of different types, comprising:

recognition means for recognizing communication states for each type of data in a case where data of a first type and data of a second type, which is different from the first type, are communicated by the communication frame; and
communication frame assembling means for assembling the communication frame on the basis of a recognition result of said recognition means, and adding information based on the communication states for each type of data to the communication frame, and
generating means for generating a plurality of secondary frames of a single data type by converting the communication frame using the added information and for generating a third frame by converting at least one of the plurality of secondary frames, wherein said third frame is configured to interface with a predetermined network.

3. The apparatus according to claim 2, wherein the information includes information indicating presence/absence of the communication data.

4. The apparatus according to claim 2, wherein the information includes the number of data of the first type included in the communication frame.

5. The apparatus according to claim 2, further comprising determination means for determining time information used for retransmitting a communication frame transmitted by said transmission means, on the basis of the recognition result of said recognition means.

6. The apparatus according to claim 5, wherein said determination means determines the time information on the basis of the presence/absence of the data of the first type.

7. The apparatus according to claim 5, wherein said determination means determines the time information on the basis of the number of the data of the first type.

8. A communication apparatus for communicating a communication frame, comprising:

reception means for receiving the communication frame which is obtained by time-division multiplexing of a first type data and a second type data, which is different from the first type data; and acquisition means for acquiring communication data, on the basis of information of communication states for each type of data added to the communication frame received by said reception means, and generating means for generating a plurality of secondary frames of a single data type by converting the communication frame using the added information and for generating a third frame by converting at least one of the plurality of secondary frames, wherein said third frame is configured to interface with a predetermined network.

9. The apparatus according to claim 8, wherein the information includes information indicating presence/absence of the communication data.

10. The apparatus according to claim 8, wherein the information includes the number of data of the first type included in the communication frame.

11. The apparatus according to claim 8, further comprising transmission means for transmitting the communication data acquired by said acquisition means to another communication apparatus.

12. The apparatus according to claim 11, wherein said transmission means comprises communication frame assembling means for assembling a communication frame with a format different from the format of the communication frame received by said reception means using the communication data acquired by said acquisition means.

13. A method of controlling a communication system having first and second communication apparatuses, and communicating a communication frame obtained by time-division multiplexing a plurality of communication data, said method comprising:

at said first communication apparatus:

recognizing communication states for each of different types of data in a case where data of a first type and data of a second type, which is different from the first type, are communicated by the communication frame;

assembling the communication frame on the basis of a recognition result in said recognition step, and adding information based on the communication states for each type of data to the communication frame; and transmitting the communication frame to said second communication apparatus, and at said second communication apparatus:

acquiring communication data on the basis of the information added to the communication frame and transmitted in said transmitting step;

generating a plurality of secondary frames of a single data type by converting the communication frame using the added information; and generating a third frame by converting at least one of the plurality of secondary frames, wherein said third frame is configured to interface with a predetermined network.

14. A method of controlling a communication apparatus for communicating a communication frame obtained by time-division multiplexing a plurality of communication data of different types, comprising:

recognizing communication states for each type of data in a case where data of a first type and data of a second type, which is different from the first type, are communicated by the communication frame; and assembling the communication frame on the basis of a recognition result in said recognition step, and adding information based on the communication states for each type of data to the communication frame, generating a plurality of secondary frames of a single data type by converting the communication frame using the added information; and generating a third frame by converting at least one of the plurality of secondary frames, wherein said third frame is configured to interface with a predetermined network.

15. A method of controlling a communication apparatus for communicating a communication frame, comprising:

receiving the communication frame which is obtained by time-division multiplexing of a first type and a second type data, which is different from the first type; and acquiring communication data, on the basis of information of communication states for each type of data added to the communication frame received in said receiving step, generating a plurality of secondary frames of a single data type by converting the communication frame using the added information; and generating a third frame by converting at least one of the plurality of secondary frames, wherein said third frame is configured to interface with a predetermined network.

16. The method according to claim 15, further comprising the transmission step of transmitting the communication data acquired in the acquisition step to another communication apparatus, wherein the transmission step comprises the communication frame assembling step of assembling a communication frame with a format different from the format of the communication frame received in the reception step using the communication data acquired in the acquisition step.

17. A communication apparatus comprising:

transmission means for transmitting a communication frame; and determination means for determining a timeout time used for retransmitting the communication frame transmitted by said transmission means, on the basis of time slot assignment of the communication frame transmitted by said transmission means.

18. The apparatus according to claim 17, wherein
said determination means determines the timeout time used for retransmitting the communication frame transmitted by said transmission means, on the basis of a number of time slots included in the communication frame.

19. A method of controlling a communication apparatus comprising:
   a transmission step of transmitting a communication frame; and
   a determination step of determining a timeout time used for retransmitting the communication frame transmitted in said transmission step, on the basis of time slot assignment of the communication frame transmitted in said transmission step.

20. The method according to claim 19, wherein
the timeout time used for retransmitting the communication frame transmitted in said transmission step is determined on the basis of a number of time slots included in the communication frame, in said determining step.

21. A communication system having first and second communication apparatuses, and communicating data frames between the first and second communication apparatuses, wherein the first communication apparatus is interfaced with sources of a plurality of different traffic components and the second communication apparatus is interfaced with a plurality of different types of networks,
   said first communication apparatus comprising:
      assembling means for assembling a first frame by time-division multiplexing the plurality of different traffic components from the sources, and for adding identity information of the different traffic components to the first frame; and
      transmission means for transmitting the first frame to the second communication apparatus, and
   said second communication apparatus comprising:
      reception means for receiving the first frame;
      generating means for generating a second frame of a single data type by separating the first frame into a plurality of frames of a single traffic component using the added identity information; and
      generating means for generating a third frame by converting the second frame, thereby the format of the third frame is compatible with one of the plurality of different types of predetermined networks.

* * * * *

UNITED STATES PATENT AND TRADEMARK OFFICE
CERTIFICATE OF CORRECTION

PATENT NO.   : 6,625,166 B2
DATED        : September 23, 2003
INVENTOR(S)  : Tsukamoto et al.

It is certified that error appears in the above-identified patent and that said Letters Patent is hereby corrected as shown below:

Column 9,
Line 21, delete "101111110" and insert -- 01111110 --

Signed and Sealed this

Twenty-first Day of June, 2005

JON W. DUDAS
*Director of the United States Patent and Trademark Office*